US012544755B2

(12) United States Patent
Wang et al.

(10) Patent No.: US 12,544,755 B2
(45) Date of Patent: Feb. 10, 2026

(54) WHOLE-PROCESS BIOLOGICAL DETECTION DEVICE

(71) Applicants: CAPITALBIO CORPORATION, Beijing (CN); TSINGHUA UNIVERSITY, Beijing (CN)

(72) Inventors: Lei Wang, Beijing (CN); Liang Bai, Beijing (CN); Xiang Chen, Beijing (CN); Tengfei Guo, Beijing (CN); Xinying Zhou, Beijing (CN); Jing Cheng, Beijing (CN); Fei Wen, Beijing (CN); Yanan Wang, Beijing (CN); Longtang Zheng, Beijing (CN); Peng Liu, Beijing (CN); Baolian Li, Beijing (CN); Youchun Xu, Beijing (CN); Bin Zhuang, Beijing (CN); Wanli Xing, Beijing (CN)

(73) Assignees: CAPITALBIO CORPORATION, Beijing (CN); TSINGHUA UNIVERSITY, Beijing (CN)

( * ) Notice: Subject to any disclaimer, the term of this patent is extended or adjusted under 35 U.S.C. 154(b) by 1292 days.

(21) Appl. No.: 17/249,398

(22) Filed: Mar. 1, 2021

(65) Prior Publication Data

US 2021/0322980 A1 Oct. 21, 2021

(30) Foreign Application Priority Data

Apr. 18, 2020 (CN) ......................... 202010308398.0

(51) Int. Cl.
*B01L 3/00* (2006.01)

(52) U.S. Cl.
CPC ..... *B01L 3/502715* (2013.01); *B01L 3/50273* (2013.01); *B01L 3/502746* (2013.01);
(Continued)

(58) Field of Classification Search
CPC ........... B01L 3/502715; B01L 3/50273; B01L 3/502746; B01L 2200/027;
(Continued)

(56) References Cited

U.S. PATENT DOCUMENTS

2010/0234237 A1* 9/2010 Yoo ........................ C12Q 1/686 506/7
2013/0344496 A1 12/2013 Peytavi et al.

FOREIGN PATENT DOCUMENTS

CN 103403521 A 11/2013
CN 105316224 A 2/2016
(Continued)

OTHER PUBLICATIONS

Extended European Search Report in EP 21154738.5 issued Jul. 1, 2021.

(Continued)

*Primary Examiner* — Rebecca M Giere
(74) *Attorney, Agent, or Firm* — Knobbe, Martens, Olson & Bear, LLP

(57) ABSTRACT

A whole-process biological detection device is provided. The whole-process biological detection device belongs to the technical field of biological detection, and includes at least one reactor, where the reactor includes at least one sample-loading unit, at least one liquid release-control unit, at least one extraction unit, at least one liquid switch-control unit, at least one liquid collection unit, at least one liquid transfer unit, at least one liquid flow-control unit, at least one liquid quantitative dispersion unit and multiple reaction cells. The product of the solution has the characteristics of high integration, no need for additional reagents, simple operation, stable and reliable, etc., thereby achieving the
(Continued)

goal of sealing the whole process of biological detection and effectively avoiding cross-contamination between samples and equipment.

18 Claims, 14 Drawing Sheets

(52) U.S. Cl.
CPC ... *B01L 2200/027* (2013.01); *B01L 2200/028* (2013.01); *B01L 2200/0605* (2013.01); *B01L 2200/0631* (2013.01); *B01L 2200/0668* (2013.01); *B01L 2200/0684* (2013.01); *B01L 2200/147* (2013.01); *B01L 2200/16* (2013.01); *B01L 2300/043* (2013.01); *B01L 2300/0867* (2013.01); *B01L 2300/087* (2013.01); *B01L 2300/18* (2013.01)

(58) Field of Classification Search
CPC ....... B01L 2200/028; B01L 2200/0605; B01L 2200/0631; B01L 2200/0668; B01L 2200/0684; B01L 2200/147; B01L 2200/16; B01L 2300/043; B01L 2300/0867; B01L 2300/087; B01L 2300/18; B01L 2300/044; B01L 2300/0672; B01L 2300/0806; B01L 2400/0409; B01L 2400/0622; B01L 2400/0683; B01L 3/502738; B01L 3/5027; C12Q 1/6844; C12Q 1/686
See application file for complete search history.

(56) References Cited

FOREIGN PATENT DOCUMENTS

| | | | |
|---|---|---|---|
| CN | 205687904 | U | 11/2016 |
| CN | 106513063 | A | 3/2017 |
| CN | 207599139 | U | 7/2018 |
| CN | 208649284 | U | 3/2019 |
| CN | 110452802 | A | 11/2019 |
| EP | 1 955 770 | A2 | 8/2008 |
| WO | WO 2006/118420 | A1 | 11/2006 |
| WO | WO 2015/084458 | A2 | 6/2015 |

OTHER PUBLICATIONS

Strohmeier, O, et al., "Real-time PCR based detection of a panel of food borne pathogens on a centrifugal microfluidic LabDisk with on-disk quality controls and standards for quantification," Electronic Supplemental Informations—ESI for Analytical Methods, The Royal Society of Chemistry 2014.

* cited by examiner

WHOLE-PROCESS BIOLOGICAL DETECTION DEVICE

CROSS-REFERENCE TO RELATED APPLICATIONS

This patent application claims priority to Chinese patent application No. 202010308398.0, entitled "FULL-PROCESS BIOLOGICAL DETECTION DEVICE", and filed with the China National Intellectual Property Administration on Apr. 18, 2020, the entire disclosure of which is incorporated herein by reference.

FIELD

The present application relates to the technical field of biological detection, and in particular to a whole-process biological detection device.

BACKGROUND

Microfluidic chip technology is a kind of technology of integrating the basic operations such as sample preparation, separation, reaction and detection in various biological, chemical or medical analysis processes onto a chip of several square centimeters to tens of square centimeters. Because of its high integration, high automation and low consumption of samples and reagents, it has been widely used in biochemical detection, nucleic acid amplification, immunoassay, cell sorting, food safety and environmental monitoring and many other fields.

Patent document 1 (CN103831140A) proposes a microfluidic chip device for nucleic acid detection based on centrifugal drive, which solves the problems of automatic and accurate quantitative dispersion and physical isolation of liquid. By pre-burying the amplification primers in multiple reaction cells, parallel detection for multiple indexes is realized, but a nucleic acid extraction is still needed to be done in advance, and reagents needed for amplification reaction are externally arranged.

Patent document 2 (CN205797240U) proposes an integrated reaction unit with a sample cell, a mixing cell and multiple reaction cells, which integrates functions of biological particle lysis, nucleic acid extraction, pre-storage of amplification reagents and liquid quantitative distribution, and realizes integration of the whole process of nucleic acid detection for multi indexes of simple samples. However, due to the lack of nucleic acid purification function, the device cannot handle complex samples, and its application is limited.

Patent document 3 (CN103403521B) discloses a fluid centripetal device for testing components of biological materials in a fluid. The embodiments thereof mentioned that the device can be used for nucleic acid extraction and detection in samples. The device has the advantages of simple structure and easy manufacture, but has certain disadvantages. First of all, the device does not have a nucleic acid purification module, and directly amplifies the sample after lysis, so it can only process some samples with simple components, but is not suitable for samples with complex components. Secondly, the device does not have a nucleic acid extraction module, and for some samples with low nucleic acid concentration, the detection sensitivity is difficult to guarantee due to the lack of enrichment function.

Patent document 4 (CN105316224A) discloses a fully automatic microfluidic chip for nucleic acid extraction and PCR amplification, which includes at least one main body.

The main body includes: a nucleic acid extraction unit, which is used for sequentially extracting, cleaning, and eluting nucleic acids under the drive of centrifugal force and capillary force; a PCR amplification unit, which is used for PCR reaction amplification; and a waste liquid unit, which includes a waste liquid chamber for storing waste liquid. Judging from the specific technical solution given by the patent, its practicability and feasibility are not high. First of all, the trident pipe connecting the nucleic acid extraction unit, PCR amplification unit and waste liquid unit is only a simple trifurcation structure, which is easy to cause the liquid to deviate from the expected direction and enter the opposite side in practice. Whether the waste liquid enters the nucleic acid recovery unit or the nucleic acid enters the waste liquid unit, it will have a serious impact on the subsequent reaction and lead to the failure of the whole experimental process. Secondly, the patent mentions that the absorption and elution of nucleic acid can be realized at a lower rotating speed of 1500 rpm, which indicates that the solid-phase absorption substrate is in a loose state, and the efficiency of nucleic acid purification and recovery is low, which easily leads to the failure or ineffectiveness of the downstream amplification reaction due to the inability to effectively recover nucleic acids. In addition, the chip design does not include the storage of cleaning solution and eluent on the chip, which is inconvenient to use in practice, and the sequential release of liquid is very unreliable.

It can be seen that the current existing technical solutions have the following problems: 1) the integration level is low, and the whole process is not integrated, and more manual operation is still needed to accomplish the complete biological detection; 2) the versatility is not enough, only specific types of samples can be handled, but biological samples with slightly complex components cannot be handled, and the application scope is limited, which cannot meet the actual inspection needs; 3) the feasibility is not high, and some designs cannot pass reasonable scrutiny or practice verification; 4) the detection performance is poor, due to compromises or deficiencies in design, the actual detection performance often fails to meet the requirements; and 5) many deficiencies in other aspects, such as poor sealing and practicability, high requirements for operators or testing equipment, and high risks of cross-contamination between different samples or between samples and equipment, etc.

Therefore, how to provide a whole-process integrated biological detection device with high integration, good versatility, excellent performance, simple operation, high technical feasibility and practicability is a technical problem that needs to be solved by those skilled in the art.

SUMMARY

In view of this, an object of the present application is to provide a whole-process biological detection device, which has the characteristics of high integration, no need for additional reagents, simple operation, stable and reliable, etc., so as to achieve the goal of sealing the whole process of biological detection and effectively avoid cross-contamination between samples and equipment.

In order to achieve the above objects, the following technical solutions are provided according to the present application.

A whole-process biological detection device includes at least one reactor, where the reactor includes at least one sample-loading unit, at least one liquid release-control unit, at least one extraction unit, at least one liquid switch-control unit, at least one liquid collection unit, at least one liquid transfer unit, at least one liquid flow-control unit, at least one liquid quantitative dispersion unit and multiple reaction cells.

The above units are communicated in a preset sequence through flow channels, where, the sample-loading unit and the liquid release-control unit are respectively communicated to the upstream of the extraction unit, and the downstream of the extraction unit is communicated to the liquid switch-control unit, and the downstream of the liquid switch-control unit is communicated to the liquid collection unit and the liquid transfer unit respectively; the liquid transfer unit is communicated to the downstream liquid quantitative dispersion unit through the liquid flow-control unit; and the liquid quantitative dispersion unit is in communication with multiple downstream reaction cells through multiple comb-tooth branch pipes in one-to-one correspondence.

While the reactor rotates around a rotation axis of the chip, the liquid in the reactor can flow from the upstream unit to the downstream unit through each flow channel under the centrifugal force or the surface tension or both of the centrifugal force and the surface tension.

Preferably, the reactor further includes at least one pre-amplification unit, and the sample-loading unit includes a sample inlet and a sample-loading chamber, where the sample-loading chamber is a lysis unit, and the lysis unit is communicated to the downstream of the sample inlet, the downstream of the lysis unit is in communication with the extraction unit through the liquid flow-control unit, and the pre-amplification unit is connected between the liquid switch-control unit and the liquid transfer unit. The pre-amplification unit includes a pre-amplification cell and one or more sets of parallel quantifying cells located at the upstream of the pre-amplification cell, and a dry pre-amplification reagent is provided in the pre-amplification cell. The upstream of the quantifying cell is connected with an outlet of the liquid switch-control unit, and the downstream of the quantifying cell is connected with the pre-amplification cell through the liquid flow-control unit; and the liquid transfer unit includes a hollow chamber, a product-transfer quantifying unit and a mixing chamber, the downstream of the pre-amplification unit is in communication with the hollow chamber through the liquid flow-control unit, and the downstream of the hollow chamber is connected with the product-transfer quantifying unit; the product-transfer quantifying unit is connected with the mixing chamber through the liquid flow-control unit, and the downstream of the mixing chamber is in communication with the downstream liquid quantitative dispersion unit through the liquid flow-control unit.

Preferably, the product-transfer quantifying unit includes a transfer chamber and a product-quantifying chamber. The distance between the transfer chamber and a chip rotation center is smaller than the distance between the hollow chamber and the chip rotation center. A bottom outlet of the hollow chamber is connected to the top of the transfer chamber through a liquid transfer channel, the downstream of the transfer chamber is in communication with the product-quantifying chamber, and the downstream of the product-quantifying chamber is in communication with the mixing chamber through the liquid flow-control unit.

Preferably, the transfer chamber is filled with a liquid absorbing material for absorbing liquid reagents.

Preferably, the product-transfer quantifying unit includes a product-quantifying chamber located at the downstream of the hollow chamber and a product-overflow chamber connected in parallel with the product-quantifying chamber, the downstream of the hollow chamber is connected with the product-quantifying chamber through the liquid flow-control unit, and the downstream of the product-quantifying chamber is connected with the mixing chamber through the liquid flow-control unit.

Preferably, the product-transfer quantifying unit includes a serpentine pipe, and the distance between the serpentine pipe and the chip rotation center is smaller than the distance between the hollow chamber and the chip rotation center, and the bottom outlet of the hollow chamber is connected to the top of the serpentine pipe through the liquid transfer channel, and the bottom outlet of the serpentine pipe is in communication with the mixing chamber.

Preferably, the lysis unit overlaps with part of the liquid release-control unit in a radial direction of the chip, and the lysis unit is located below the liquid release-control unit.

Preferably, the liquid release-control unit includes a diversion groove provided on the reactor and a compressible liquid storage container which hermetically covers the diversion groove and is used for storing liquid. The liquid storage container includes a tough upper cover positioned outside the reactor and a brittle bottom bracket positioned between the tough upper cover and the diversion groove. The brittle bottom bracket seals against an upper end opening of the diversion groove and defines a closed chamber for storing liquid together with the tough upper cover, and the fracture strength of the brittle bottom bracket is lower than that of the tough upper cover. When the liquid pressure on the brittle bottom bracket is greater than or equal to the rupturing strength of the brittle bottom bracket, the brittle bottom bracket ruptures and communicates the liquid storage container with the diversion groove.

Preferably, a pressure-bearing platform is fixed inside the diversion groove, and a cutting edge is provided at an upper end of the pressure-bearing platform, and the cutting edge abuts against a lower surface of the brittle bottom bracket.

Preferably, the tough upper cover includes a flexible polymer film, and the brittle bottom bracket includes a metal film.

Preferably, an outer surface of the flexible polymer film of the tough upper cover is covered with a metal material layer, and a surface of the brittle bottom bracket is covered with a polymer material layer.

Preferably, the flexible polymer film and the polymer material layer are made of PVC, PP, PE or PET, and the metal film and the metal material layer are made of aluminum foil or tin foil.

Preferably, the liquid release-control unit includes a diversion channel arranged on the reactor and a slidable liquid collection unit which hermetically covers the diversion channel. The slidable liquid collection unit includes a cylindrical sliding chamber with two open ends, where a lower end opening of the sliding chamber surrounds an upper end opening of the diversion channel and is hermetically connected to the surface of the reactor. A liquid storage cylinder for storing liquid is provided inside the sliding chamber and is slidable up and down along an inner wall of the sliding chamber, and the outer periphery of the liquid storage cylinder is in sealing and sliding fit with the inner wall of the sliding chamber. A position-limiting structure for limiting the liquid storage cylinder from sliding out is provided at an upper end opening of the sliding chamber, a sealing film is provided at the bottom of the liquid storage cylinder, and a piercer located below the sealing film for piercing the sealing film is fixed on a side where the upper end opening of the diversion channel is located.

Preferably, a mating surface of the liquid storage cylinder and the sliding chamber is a cylindrical surface.

Preferably, one or more sealing film is provided, and the sealing film is a polymer film and/or a metal film.

Preferably, the polymer film is PVC film, PP film, PE film or PET film, and the metal film is aluminum foil or tin foil.

Preferably, the liquid release-control unit includes a liquid storage chamber and one liquid flow-control unit connected to the downstream of the liquid storage chamber.

Preferably, one liquid flow-control unit is provided between the sample-loading unit and the extraction unit.

Preferably, the liquid flow-control unit is a rotary opening-closing component, and the rotary opening-closing component includes a fixed housing, a base and a cylindrical rotor. The fixed housing is a cylindrical housing with two open ends, and a lower end of the fixed housing is fixed on the base. The rotor rotates around an axis of the rotor itself and cooperates with an inner wall of the fixed housing. A position-limiting structure for limiting the rotor from coming out is provided at an upper end of the fixed housing, a rotating cooperation structure for driving the rotor to rotate is provided at the upper end of the rotor, and a strip-shaped groove is provided at a lower end of the rotor. An upper surface of the base is closely attached to a lower end surface of the rotor and is provided with an upstream flat-end pipe communicating with the upstream unit and a downstream flat-end pipe communicating with the downstream unit, and the upstream flat-end pipe and the downstream flat-end pipe are spaced apart;

when the rotor rotates to a communication position, the strip-shaped groove communicates the upstream flat-end pipe with the downstream flat-end pipe; and when the rotor rotates to an occluded position, the lower end surface of the rotor cuts off the upstream flat-end pipe from the downstream flat-end pipe.

Preferably, the liquid flow-control unit is a curved capillary pipe, a pipe inlet of the capillary pipe is connected with an outlet of the upstream unit and a pipe outlet of the capillary pipe is connected with an inlet of the downstream unit. The distance between the pipe outlet and the chip rotation center is greater than that between the pipe inlet and the chip rotation center, and the distance between a proximal end, which is closest to the chip rotation center, of the capillary pipe and the chip rotation center is smaller than the distance between a proximal end of the upstream unit and the chip rotation center.

Preferably, the cross section of the capillary pipe is rectangular, trapezoidal, semicircular or circular, and the equivalent diameter of the cross section of the capillary pipe is 0.05 mm to 0.5 mm.

Preferably, a part of the surface of the inner wall of the capillary pipe is a hydrophilic surface that has undergone hydrophilic surface treatment, and a contact angle between the liquid and the hydrophilic surface is smaller than the contact angle between the liquid and the rest of the surface of the inner wall of the capillary pipe;

or the entire surface of the inner wall of the capillary pipe is a hydrophilic surface that has undergone hydrophilic surface treatment.

Preferably, a passive blocker is provided between the pipe inlet of the capillary pipe and the proximal end of the capillary pipe.

Preferably, a part of the surface of the inner wall of the passive blocker is a hydrophobic surface that has undergone hydrophobic surface treatment, and the contact angle between the liquid and the hydrophobic surface is greater than the contact angle between the liquid and the partial surface of the inner wall of the passive blocker; or the entire surface of the inner wall of the passive blocker is a hydrophobic surface that has undergone hydrophobic surface treatment.

Preferably, the liquid flow-control unit includes multiple capillary pipes connected in series with end to end.

Preferably, the liquid flow-control unit is a section of a pipe, a part of the pipe is provided with a local thickened section, and a hot melt material is sealed in the local thickened section.

Preferably, the local thickened section is located in a rear half of the pipe, a distance between the local thickened section and an outlet of the pipe is less than or equal to the length of the local thickened section itself, and the part between the local thickened section and the outlet of the pipe extends in the radial direction of the chip.

Preferably, the pipe is a straight pipe or a curved pipe, the cross section of the pipe is rectangular, trapezoidal, semicircular or circular, and the equivalent diameter of the cross section of the pipe is 0.2 mm to 2 mm.

Preferably, the melting point of the hot melt material is between 35° C. and 100° C.

Preferably, the hot melt material is paraffin wax.

Preferably, the liquid flow-control unit is a flow resistance valve pipe locally provided with a flow resistance increasing element, and when the liquid pressure in the flow resistance valve pipe is smaller than a conduction hydraulic threshold of the flow resistance increasing element, the flow resistance increasing element prevents the liquid from passing through; and when the liquid pressure in the flow resistance valve pipe is greater than or equal to the conduction hydraulic threshold of the flow resistance increasing element, the flow resistance increasing element allows the liquid to pass through.

Preferably, the flow resistance increasing element is a thin flow resistance increasing pipe with an equivalent diameter between 0.1 mm and 1 mm and a length greater than 1 mm.

Preferably, the flow resistance increasing element is a porous-material valve filled and sealed inside the flow resistance valve pipe.

Preferably, the porous-material valve includes one or more pieces of filter paper, woven cloth or resin with pores.

Preferably, the porous-material valve is a valve block structure with pores, and the valve block structure includes multiple resin particles, ceramic particles or glass particles.

Preferably, the extraction unit includes an upstream fluid chamber and a downstream fluid chamber arranged in series, and a porous biomacromolecule absorption material filled in the downstream fluid chamber. The upstream fluid chamber has multiple fluid inlets, and the downstream fluid chamber has a fluid outlet, and the volume of the upstream fluid chamber is larger than the maximum value of the volumes of the upstream sample-loading unit and the liquid release-control unit.

Preferably, the cross section of the downstream fluid chamber is gradually reduced from the fluid inlet to the fluid outlet of the downstream fluid chamber.

Preferably, the extraction unit consists of one or more fluid chambers connected in series and a porous biomacromolecule absorption material filled in the fluid chamber, where the fluid chamber has an upstream fluid inlet and a downstream fluid outlet.

Preferably, the fluid chamber used for stuffing the porous biomacromolecule absorption material in the extraction unit has a shape of the inlet cross sectional size being larger than the outlet cross sectional size, and the fluid chamber as a whole has a contracted structure.

Preferably, the fluid chamber structure may be a funnel-shaped structure as a whole or have a funnel-shaped outlet end, but the present application is not limited thereto. The upstream of the funnel-shaped structure has a large cross section, and the downstream of the funnel-shaped structure has a small cross section and gradually converges at the fluid outlet.

Preferably, the porous biomacromolecule absorption material may be, but is not limited to, silica fibers or particles or loose films, ion exchange resins, silica nanoparticles, magnetic particle materials with silica on the surface, porous materials coated with silica nanomaterials on the surface, porous materials coated with chitosan on the surface, or various other porous materials with silanol modification on the surface.

Preferably, the porous material is in the shape of loose film, lamella or granule, where the loose film may be a single-layer film or a multi-layer film, and contain layers of different sizes or particles of different sizes.

Preferably, the fluid chamber may be filled with the same porous materials or different porous materials.

Preferably, the liquid switch-control unit is a rotating switch assembly, and the rotating switch assembly includes a fixed housing, a base and a cylindrical rotor. The fixed housing is a cylindrical housing with two open ends, a lower end of the fixed housing is fixed on the base, and the rotor rotates around an axis of the rotor itself and cooperates with an inner wall of the fixed housing. A position-limiting structure for limiting the rotor from coming out is provided at an upper end of the fixed housing. A rotating cooperation structure for driving the rotor to rotate is provided at the upper end of the rotor, and a strip-shaped groove is provided at the lower end of the rotor. The upper surface of the base is closely attached to the lower end surface of the rotor, and is provided with an upstream flat-end pipe communicating with the upstream unit and a first downstream flat-end pipe and a second downstream flat-end pipe respectively communicating with two downstream units, and the upstream flat-end pipe and the two downstream flat-end pipes are spaced apart;

when the rotor rotates to a first communication position, the strip-shaped groove communicates the upstream flat-end pipe with the first downstream flat-end pipe; and when the rotor rotates to a second communication position, the strip-shaped groove communicates the upstream flat-end pipe with the second downstream flat-end pipe; and when the rotor rotates to an occluded position, the lower end surface of the rotor cuts off the upstream flat-end pipe.

Preferably, the upstream flat-end pipe is in communication with the extraction unit, the first downstream flat-end pipe is in communication with the liquid collection unit, and the second downstream flat-end pipe is in communication with the liquid transfer unit.

Preferably, the liquid switch-control unit includes an arc-shaped pipe and a ferromagnetic ball located inside the arc-shaped pipe. A pipe center line of the arc-shaped pipe is arc-shaped and the middle part of the arc-shaped pipe protrudes towards the chip rotation center. The cross section of the arc-shaped pipe is circular, a liquid inlet for communicating with the upstream unit is provided at the proximal end of the arc-shaped pipe, and two liquid outlets are respectively provided at two distal ends, which are furthest from the chip rotation center, of the arc-shaped pipe. The ferromagnetic ball is in sealing contact with the inner wall of the arc-shaped pipe and is configured to slide back and forth between the two distal ends of the arc-shaped pipe to block the liquid outlet.

The liquid inlet that leads to the upstream is connected with the fluid outlet of the upstream extraction unit, and the liquid outlet is respectively connected with the downstream liquid collection unit and the downstream liquid transfer unit.

Preferably, the liquid switch-control unit includes a deflection cavity, a liquid inlet communicating with the upstream unit is provided in the middle of the proximal end of the deflection cavity, and two liquid outlets communicating with the downstream unit are respectively provided at the left and right sides of the distal end of the deflection cavity.

Preferably, the dimension of the deflection cavity in a radial direction of the chip ranges from 1 mm to 10 mm, the dimension in a normal direction of the chip ranges from 1 mm to 10 mm, and the dimension in a direction perpendicular to a plane of the reactor ranges from 0.2 mm to 5 mm.

Preferably, the equivalent diameter of the cross section of the liquid inlet of the deflection cavity ranges from 0.1 mm to 1 mm.

Preferably, a deflection structure protruding toward the inner side of the deflection cavity is provided at one side of the deflection cavity away from the chip rotation center, and the deflection structure is toward one of the liquid outlets relative to the midpoint position of the two liquid outlets.

Preferably, the contact angle between the inner surface of the deflection cavity and the liquid flowing therethrough is greater than 55 degrees. The effect of the contact angle between the inner surface of the deflection cavity and the passing-by liquid is obtained by appropriate chemical treatment on the inner surface of the cavity.

Preferably, the liquid collection unit includes a liquid storage chamber, a liquid storage inlet communicating with the upstream unit is provided at the top of the liquid storage chamber, and the volume of the liquid storage chamber is larger than the sum of the volumes of the upstream sample-loading unit and the upstream liquid release-control unit.

Preferably, the whole-process biological detection device includes a reactor plate, where multiple uniformly distributed reactors are fixed on the circumference of the reactor plate.

The whole-process biological detection device provided by the present application includes at least one reactor, where the reactor includes at least one sample-loading unit, at least one liquid release-control unit, at least one extraction unit, at least one liquid switch-control unit, at least one liquid collection unit, at least one liquid transfer unit, at least one liquid flow-control unit, at least one liquid quantitative dispersion unit and multiple reaction cells.

The above units are communicated in a preset sequence through flow channels, where, the sample-loading unit and the liquid release-control unit are respectively communicated to the upstream of the extraction unit, and the downstream of the extraction unit is communicated to the liquid switch-control unit, and the downstream of the liquid switch-control unit is communicated to the liquid collection unit and the liquid transfer unit respectively; the liquid transfer unit is communicated to the downstream liquid quantitative dispersion unit through the liquid flow-control unit; and the liquid quantitative dispersion unit is in communicated to multiple downstream reaction cells through multiple comb-tooth branch pipes in one-to-one correspondence.

While the reactor rotates around the rotation axis of the chip, the liquid in the reactor can flow from the upstream unit to the downstream unit through each flow channel under the centrifugal force or the surface tension or both of the centrifugal force and the surface tension.

The biological detection process of the present application is as follows.

Predetermined liquid or reagents related to biological detection reaction are pre-buried in the sample-loading unit, liquid release-control unit, liquid transfer unit, liquid quantitative dispersion unit and reaction cells of the chip. When detection starts, the chip is mounted on a centrifugal rotating apparatus. The sample to be tested is added through the sample-loading unit, and then the sample inlet is closed; the centrifugal rotating apparatus is started, the liquid in the sample-loading unit is transferred to the extraction unit, and the extraction unit absorbs and purifies the sample to be tested in the sample liquid. The waste liquid after passing through the extraction unit flows into the liquid collection unit for recovery through the liquid switch-control unit, and then the cleaning solution and eluent are released in turn by the liquid release-control unit. The purified test sample is obtained after the eluent passes through the extraction unit, and the purified test sample is transferred to the liquid transfer unit by the liquid switch-control unit. Similarly, the purified test sample liquid in the liquid transfer unit is transferred to the liquid quantitative dispersion unit through the liquid flow-control unit by means of centrifugal force. Finally, with the rotation speed control of the centrifugal rotating apparatus, the liquid is transferred through the comb-tooth branch pipes to the reaction cells at the end for reaction, and the test result can be obtained.

The present application has the following advantageous effects.

1) A highly integrated whole-process biological detection device is provided according to the present application, which integrates the lysis, purification, amplification and detection of biological cells or biological particles into a whole, and realizes the integration of the totally enclosed detection analysis and the whole detection process of biological macromolecules (such as nucleic acids);
2) According to the present application, the reagents required for biological detection are stored in advance, only one routine of sample-loading and sealing is required during detection, no other pipetting operations are required, the biological reaction and detection process can be fully automated, the operation is simple, which has high efficiency and convenience of "sample in and result out";
3) In the present application, the entire biological reaction process is completed in a sealed container, which can effectively avoid the risk of cross-contamination between samples and equipment associated with routine biological reaction operations in the laboratory and avoid result errors caused by improper human operations; and in a case that the sample to be detected contains infectious pathogens such as bacteria, viruses, *mycoplasma* and *chlamydia*, the biosafety risk in the detection process can be effectively reduced;
4) In the present application, the centrifugal force is used as the driving mode, and the liquid is accurately controlled by adjusting the centrifugal speed in different periods. The liquid driving mode has high reliability, and the control principle and the work flow of the instrument system are simple; and
5) The device according to the present application has simple design and low cost, and is easy to process and is convenient for industrialization and large-scale production.

BRIEF DESCRIPTION OF THE EMBODIMENTS

In order to illustrate technical solutions in the embodiments of the present application or in the conventional technology more clearly, drawings used in the description of the embodiments or the conventional technology are introduced briefly hereinafter. Apparently, the drawings described hereinafter merely illustrate some embodiments of the present application, and other drawings may be obtained by those skilled in the art based on these drawings without any creative efforts.

Figure 1:
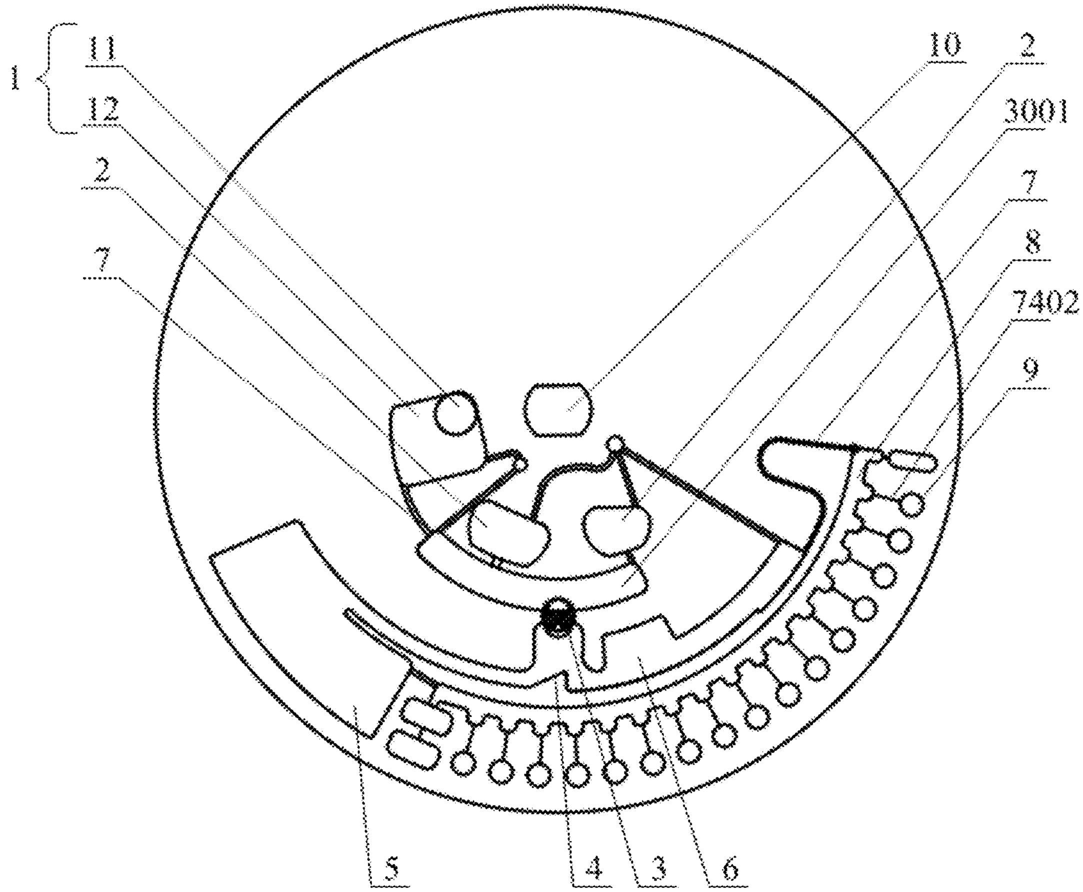
FIG. 1 is a schematic structural diagram of a chip according to a first embodiment of the present application.

Reference numerals in FIGS. 1 to 24:

| | | | |
|---|---|---|---|
| 1 | sample-loading unit, | 2 | liquid release-control unit, |
| 3 | extraction unit, | 4 | liquid switch-control unit, |
| 5 | liquid collection unit, | 6 | liquid transfer unit, |
| 7 | liquid flow-control unit, | 8 | liquid quantitative dispersion unit, |
| 9 | reaction cell, | 91 | pre-amplification cell; |
| 10 | chip rotation center, | 100 | reactor, |
| 101 | reactor plate; | | |
| 11 | sample inlet, | 1101 | sample-loading cover, |
| 12 | lysis unit, | 13 | vent hole; |
| 2101 | tough upper cover, | 2102 | diversion groove, |
| 2103 | brittle bottom bracket, | 2104 | pressure-bearing platform; |
| 2201 | liquid storage cylinder, | 2202 | sliding chamber, |
| 2203 | sealing film, | 2204 | piercer, |
| 2205 | diversion channel; | | |
| 3001 | upstream fluid chamber, | 3002 | fluid inlet, |
| 3003 | porous biomacromolecule adsorption material, | | |
| 3004 | fluid outlet; | | |
| 4101 | magnetic control valve liquid inlet, | 4102 | arc-shaped pipe, |
| 4103 | first liquid outlet of magnetic control valve, | | |
| 4104 | second liquid outlet of magnetic control valve, | | |
| 4105 | ferromagnetic ball; | | |
| 4201 | Coriolis valve liquid inlet, | 4202 | deflection cavity, |
| 4203 | first liquid outlet of Coriolis valve, | | |
| 4204 | second liquid outlet of Coriolis valve, | | |
| 4205 | deflection structure; | | |
| 61 | hollow chamber, | 62 | liquid transfer channel, |
| 63 | transfer chamber, | 64 | product-quantifying chamber, |
| 65 | product-overflow chamber, | 66 | mixing chamber, |
| 67 | serpentine pipe, | 68 | branch gas path; |
| 7100 | rotating switch assembly, | 7101 | fixed housing, |
| 7102 | base, | 7103 | strip-shaped groove, |
| 7104 | rotor, | 7105 | upstream flat-end pipe, |
| 7106 | downstream flat-end pipe, | 7107 | rotating cooperation structure, |
| 7108 | first downstream flat-end pipe, | | |
| 7109 | second downstream flat-end pipe; | | |
| 7201 | pipe inlet, | 7202 | passive blocker, |
| 7203 | proximal end of capillary pipe, | 7204 | pipe outlet, |
| 7205 | primary siphon structure, | 7206 | secondary siphon structure, |
| 7207 | third-stage siphon structure; | | |
| 7300 | hot melt valve, | 7301 | local thickened section, |
| 7302 | hot melt material; | | |
| 7401 | thin pipe with increased flow resistance, | | |
| 7402 | comb-tooth branch pipe, | 7403 | porous-material valve; |
| 8001 | weighing cell, | 8002 | buffer cell, |
| 82 | quantifying cell, | 83 | overflow cell, |
| 84 | eluent collection cell. | | |

DETAILED DESCRIPTION OF THE EMBODIMENTS

The technical solutions according to the embodiments of the present application will be described clearly and completely as follows in conjunction with the drawings in the embodiments of the present application. It is apparent that the described embodiments are only a part of the embodiments according to the present application, rather than all the embodiments. Any other embodiments obtained by those skilled in the art based on the embodiments of the present application without any creative work fall within the protection scope of the present application.

A whole-process biological detection device provided by the present application includes at least one reactor 100, where the reactor 100 includes at least one sample-loading unit 1, at least one liquid release-control unit 2, at least one extraction unit 3, at least one liquid switch-control unit 4, at least one liquid collection unit 5, at least one liquid transfer unit 6, at least one liquid flow-control unit 7, at least one liquid quantitative dispersion unit 8 and multiple reaction cells 9.

The above units are communicated in a preset sequence through flow channels, where, the sample-loading unit 1 and the liquid release-control unit 2 are respectively communicated to the upstream of the extraction unit 3, and the downstream of the extraction unit 3 is communicated to the liquid switch-control unit 4, and the downstream of the liquid switch-control unit 4 is communicated to the liquid collection unit 5 and the liquid transfer unit 6 respectively; the liquid transfer unit 6 is communicated to the downstream liquid quantitative dispersion unit 8 through the liquid flow-control unit 7; and the liquid quantitative dispersion unit 8 is communicated to multiple downstream reaction cells 9 through multiple comb-tooth branch pipes 7402 in one-to-one correspondence.

When the chip is in use, there is a chip rotation center 10 and a chip rotation axis. The chip rotation axis passes through the chip rotation center 10 and is perpendicular to a reactor plate 101. While the reactor 100 rotates around the chip rotation axis, the liquid in the reactor 100 can flow from the upstream unit to the downstream unit through each flow channel under the centrifugal force or the surface tension or both of the centrifugal force and the surface tension. The chip rotation center 10 may be located inside the reactor 100 or outside the reactor 100.

Figure 6:
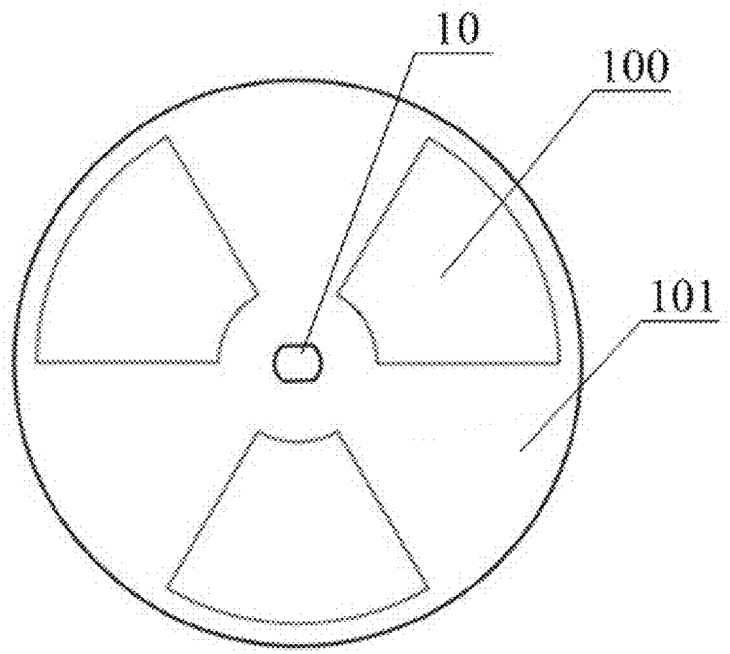
FIG. 6 is a schematic structural diagram of integrally arranged multiple reactors according to a specific embodiment of the present application.

The body of the reactor 100 is a flat-shaped object with a certain thickness and with or without through-holes, protrusions and recesses. Preferably, the whole-process biological detection device provided by the present application includes a reactor plate 101. Multiple uniformly distributed reactors 100 are fixed on the circumference of the reactor plate 101. As shown in FIG. 6, the multiple reactors 100 are uniformly arranged around the chip rotation center 10, so that the biological detection of multiple samples can be performed on one reactor plate 101 at the same time, which improves integration degree and working efficiency.

For convenience of description, the direction parallel to the reactor plate 101 and passing through the chip rotation center 10 is collectively referred to as the radial direction, and the direction parallel to the reactor plate 101 and perpendicular to the radial direction is collectively referred to as the normal direction. The side closer to the chip rotation center 10 in the radial direction is relatively internal, and the side farther away from the chip rotation center 10 in the radial direction is relatively external. The position closer to the inside of the reactor plate 101 is relatively high, and the position closer to the outside of the reactor plate 101 is relatively low. The direction perpendicular to the reactor plate 101 and away from the surface of the reactor 100 is called up, and the direction perpendicular to the reactor plate 101 and pointing to the surface of the reactor 100 is called down. The position close to the topmost is called the top, and the position close to the lowermost is called the bottom.

Preferably, the sample-loading unit 1 includes a sample inlet 11 and a sample-loading chamber, where reagents related to the reaction may be pre-stored in the sample-loading chamber or be added into the sample-loading chamber during use. The reagents may be solid or liquid, and may be in various forms such as sheet, granule, powder or paste. When performing biological detection such as nucleic acid amplification and virus detection, the sample-loading chamber is a lysis unit 12, and the lysis unit 12 is in communication with the downstream of the sample inlet 11.

Specifically, the sample inlet 11 is located on an upper surface of the chip, at the top of the lysis unit 12, and is in communication with a lysis cell through a through hole. The sample inlet 11 includes a base and a sealing plug for sealing. Apparently, the base may be integrally formed with the lysis unit 12, or may be fixed on the lysis unit 12 by bonding or welding at a later stage. It may be in any shape. Preferably, the sample inlet 11 has the best sealing effect by adopting a rotary structure. The sample inlet can be sealed by screwing the cap tightly, or the sample inlet can be sealed by a plunger, which can be selected according to actual needs. The sample inlet 11 has high versatility and is well compatible with conventional sample types.

Preferably, the sample inlet 11 is a circle or quasi-circle, rounded rectangle or other polygon with an equivalent diameter between 0.5 mm and 10 mm, and the sample inlet 11 may be blocked with adhesive tape, cover, plug or other sealing plugs.

It should be noted that, the upstream of the lysis unit 12 is connected with the sample inlet 11, and the downstream of the lysis unit is connected with the extraction unit 3 through the liquid flow-control unit 7. The lysis unit 12 is composed of a lysis chamber, zirconia beads, permanent magnet sheets, and a lysis reagent pre-stored in the lysis chamber. The lysis chamber is located below the sample inlet 11, the lysis chamber may be arranged along the radial direction of the chip, or along the circumferential direction of the chip. Zirconia beads and permanent magnet sheets are pre-stored in the lysis chamber. During operation, the permanent magnets may be arranged on the rotating platform in sequence. When the chip is centrifuged at low speed, the permanent magnet sheets in the lysis chamber agitate the zirconia beads in the chamber to grind and lyse the bacteria in the sample. Apparently, lyophilized powder such as lysis solution and bingbing solution may be pre-stored in the lysis chamber. The movement track of the permanent magnets in the lysis chamber is related to the arrangement of the lysis chamber and the permanent magnets on the rotating platform. The permanent magnets can move along the radial direction or the circumferential direction. Preferably, the grinding effect is better if the permanent magnets move along the radial direction, because the magnetic beads may sink to the bottom in the centrifugal state. Therefore, the radial movement can disturb the magnetic beads to the maximum extent, making the grinding more sufficient. In addition, the centrifugal speed during lysis should not be too high. Preferably, when the centrifugal speed is between 200 rpm and 800 rpm, the grinding effect is more sufficient. An opening is provided on a side wall of the chamber at ⅓ to ½ of the length of the side wall from the bottom of the lysis chamber, and the lysis chamber is connected to the downstream extraction unit 3 through the liquid flow-control unit 7. This design has the following three objects: First, prevent the sample sediment and zirconia beads from entering the pipe and causing blockage during high-speed centrifugation; Second, ensure that the lysed sample will not enter the extraction unit 3 in advance when grinding at low speed, and ensure that the sample can be fully ground; and Third, ensure that the liquid in the lysis chamber can be fully released during high-speed centrifugation.

It should be noted that, the liquid release-control unit 2 can store various liquid reagents for nucleic acid purification, elution and dilution. These liquid reagents include, but are not limited to, various cleaning reagents, eluents and diluents. In this solution, multiple liquid release-control units 2 may be provided, and a liquid reagent is pre-stored in each liquid release-control unit 2. In the detection process, the detection samples can be processed in various ways such as cleaning, elution, dilution and so on, by stepwise release.

It should be noted that, the liquid release-control unit 2 can realize the above functions through various structural forms. Two specific structures of the liquid release-control unit 2 are described below.

Figure 7:
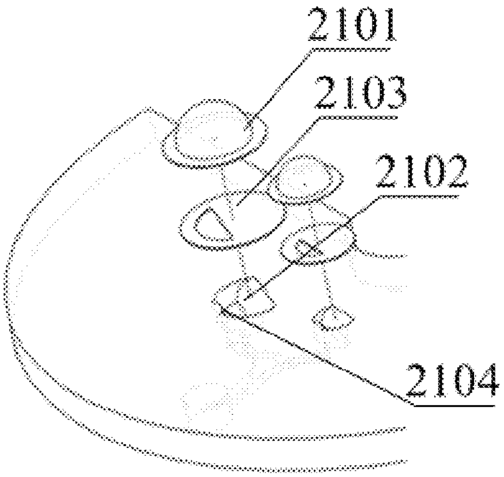
FIG. 7 is a schematic structural diagram of a liquid storage container of a liquid release-control unit according to a specific embodiment of the present application.
Figure 9:
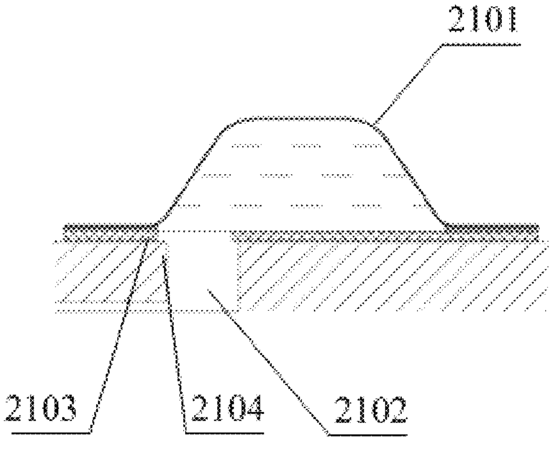
FIG. 9 is a sectional view of the liquid storage container of the liquid release-control unit according to a specific embodiment of the present application.

As shown in FIGS. 7 and 9, in a preferred solution, the liquid release-control unit 2 includes a diversion groove 2102 provided on the reactor 100 and a compressible liquid storage container which hermetically covers the diversion groove 2102 and is used for storing liquid. The liquid storage container includes a tough upper cover 2101 positioned outside the reactor 100 and a brittle bottom bracket 2103 positioned between the tough upper cover 2101 and the diversion groove 2102. The brittle bottom bracket 2103 seals against an upper end opening of the diversion groove 2102 and defines a closed chamber for storing liquid together with the tough upper cover 2101, and the fracture strength of the brittle bottom bracket 2103 is lower than that of the tough upper cover 2101. When the liquid pressure on the brittle bottom bracket 2103 is greater than or equal to the rupturing strength of the brittle bottom bracket 2103, the brittle bottom bracket 2103 ruptures and communicates the liquid storage container with the diversion groove 2102.

Specifically, the liquid storage container is formed by the bell-shaped or inverted bowl-shaped tough upper cover 2101 sealing against the brittle bottom bracket 2103, which forms a liquid storage sac as a whole. The tough upper cover 2101 can deform and collapse inward when subjected to certain external pressure, and the brittle bottom bracket 2103 can deform outward slightly when subjected to internal liquid pressure and rupture when subjected to a large internal liquid pressure. The application method is as follows: the tough upper cover 2101 of the liquid storage sac is squeezed by the external force pointing to the surface of the reactor 100, which compresses the liquid storage sac and causes the internal liquid pressure to increase, and when the pressure exceeds the bearing limit of the brittle bottom bracket 2103 of the liquid storage sac, the brittle bottom bracket 2103 will rupture, and the liquid in the liquid storage sac enters the diversion groove 2102 below from the breach; and, under the action of a certain external force, especially centrifugal force, most or all of the liquid in the liquid storage sac is released into the diversion groove 2102 and can enter the downstream.

As shown in FIG. 9, preferably, a pressure-bearing platform 2104 is fixed inside the diversion groove 2102, and a cutting edge is provided at an upper end of the pressure-bearing platform 2104, and the cutting edge abuts against a lower surface of the brittle bottom bracket 2103. The pressure-bearing platform 2104 may be specifically arranged on the downstream side of the diversion groove 2102, and the cutting edge is located below the inner edge of the sealing edge of the liquid storage sac and close to the lower surface of the brittle bottom bracket 2103. The application method is as follows: the tough upper cover 2101 of the liquid storage sac is squeezed by the external force pointing to the surface of the reactor 100, which compresses the liquid storage sac and causes the internal liquid pressure to increase, and the brittle bottom bracket 2103 deforms outward due to the internal liquid pressure and ruptures at the cutting edge due to the cutting action of the cutting edge of the pressure-bearing platform 2104, and the liquid in the liquid storage sac enters the diversion groove 2102 below from the breach; and, under the action of a certain external force, especially centrifugal force, most or all of the liquid in the liquid storage sac is released into the diversion groove 2102 and can enter the downstream.

It should be noted that, the material of the liquid storage sac has good airtightness, volatility resistance and chemical compatibility for the stored liquid. After the liquid storage sac is sealed, the composition and mass of the stored liquid can be kept relatively stable for a long time. In particular, the tough upper cover 2101 of the liquid storage sac is mainly made of a polymer film with certain toughness, and the outer surface of the liquid storage cover may or may not be covered with a layer of metal material. The brittle bottom bracket 2103 of the liquid storage sac is mainly made of a brittle metal film that is easy to crack under pressure, and the inner surface of the brittle bottom bracket may or may not be covered with a layer of polymer material. The main component of the above-mentioned polymer film and polymer material may be PVC, PP, PE, or PET, etc., and the main component of the metal film and metal material may be aluminum foil or tin foil. The tough upper cover 2101 may be sealed against the brittle bottom bracket 2103 of the liquid storage sac by adhesive materials such as ultraviolet adhesive, double-sided adhesive, hot melt adhesive, etc., and may also be directly sealed by hot pressing, hot melting, ultrasonic welding, optical welding, etc.

There are many molding methods for the liquid storage sac, which include, but are not limited to, molding processes such as blow molding, hot stamping, cold stamping, etc. The material may be, but not limited to, PC film, PS film, aluminum foil film, etc. The encapsulation process of the liquid in the liquid storage sac may be, but not limited to, processes such as gluing, hot pressing, ultrasound, and laser. The liquid release-control unit can store various liquid reagents for nucleic acid purification, elution and dilution. These liquid reagents include, but are not limited to, various cleaning reagents, eluents and diluents. The liquid storage sac is fixed on the surface of the base by bonding or welding, and the surface of the base may be provided with, but not limited to, protrusions, grooves, and pointed structures. When the liquid in the liquid storage sac needs to be released, the liquid storage sac is pressed to rupture the sealing surface of the liquid storage sac, thereby releasing the liquid.

Figure 10:
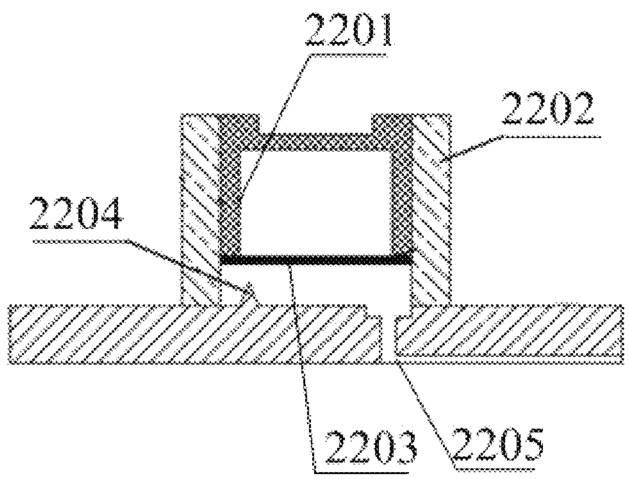
FIG. 10 is a schematic structural view of a liquid storage cylinder before release according to a specific embodiment of the present application.
Figure 11:
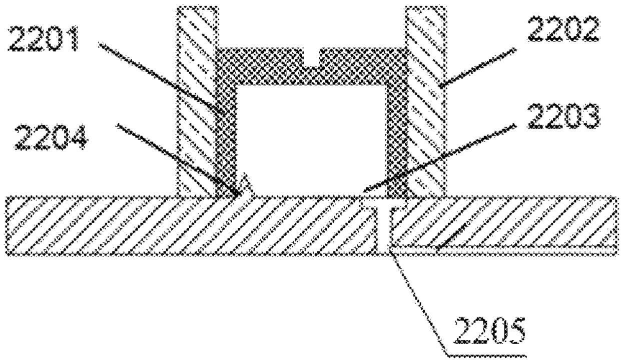
FIG. 11 is a schematic structural view of the liquid storage cylinder after release according to a specific embodiment of the present application.

As shown in FIGS. 10 and 11, in a preferred solution, the liquid release-control unit 2 includes a diversion channel 2205 arranged on the reactor 100 and a slidable liquid collection unit which hermetically covers the diversion channel 2205. The slidable liquid collection unit includes a cylindrical sliding chamber 2202 with two open ends, where a lower end opening of the sliding chamber 2202 surrounds an upper end opening of the diversion channel 2205 and is hermetically connected to the surface of the reactor 100. A liquid storage cylinder 2201 for storing liquid is provided inside the sliding chamber 2202 and is slidable up and down along an inner wall of the sliding chamber, and the outer periphery of the liquid storage cylinder 2201 is in sealing and sliding fit with the inner wall of the sliding chamber 2202. A position-limiting structure for limiting the liquid storage cylinder 2201 from sliding out is provided at an upper end opening of the sliding chamber 2202, a sealing film 2203 is provided at the bottom of the liquid storage cylinder 2201, and a piercer 2204 located below the sealing film 2203 for piercing the sealing film 2203 is fixed on a side where the upper end opening of the diversion channel 2205 is located. The above-mentioned position-limiting structure may be designed in various structural forms. For example, the upper opening of the sliding chamber 2202 is designed as a funnel structure, and the funnel structure is smaller than the cross section of the liquid storage cylinder 2201, so as to prevent the liquid storage cylinder 2201 from sliding upwards out of the sliding chamber 2202; or, a position-limiting stopper is provided inside the upper opening of the sliding chamber 2202, so as to prevent the liquid storage cylinder 2201 from falling out. The piercer 2204 is a protrusion with certain hardness and strength and a sharp tip. The bottom of the liquid storage cylinder 2201 (the end close to the reactor 100) is composed of a layer of sealing film 2203 that can be pierced by the piercer 2204, and the liquid in the liquid storage cylinder 2201 is released to the downstream through the diversion channel 2205.

The application method is as follows: the liquid storage cylinder 2201 located inside the sliding chamber 2202 is pushed down by an external force pointing to the surface of the reactor 100, so that the bottom sealing film 2203 is pierced by the piercer 2204, and the liquid in the liquid storage cylinder 2201 enters the sliding chamber 2202 from the breach; and, under the action of a certain external force, especially centrifugal force, most or all of the liquid in the liquid storage cylinder 2201 is released into the sliding chamber 2202 and can enter the downstream through the diversion channel 2205.

Preferably, the mating surface between the liquid storage cylinder 2201 and the sliding chamber 2202 is a cylindrical surface, that is, the inner chamber of the sliding chamber 2202 and the outer wall of the liquid storage cylinder 2201 are both cylindrical. In addition to sliding up and down in the sliding chamber 2202, the liquid storage cylinder 2201 is able to rotate under the action of external force around the central axis of the cylinder in the sliding chamber 2202. The application method is as follows: the liquid storage cylinder 2201 located inside the sliding chamber 2202 is pushed down by an external force pointing to the surface of the reactor 100, so that the bottom sealing film 2203 is pierced by the piercer 2204, and then the liquid storage cylinder 2201 is rotated so that the bottom sealing film 2203 is further sliced open by the piercer 2204, and the liquid in the liquid storage cylinder 2201 enters the sliding chamber 2202 from the breach; and, under the action of a certain external force, especially centrifugal force, most or all of the liquid in the liquid storage cylinder 2201 is released into the sliding chamber 2202 and can enter the downstream through the diversion channel 2205.

The sealing film 2203 at the bottom of the liquid storage cylinder 2201 may be a single-layer or multi-layer film. The sealing film may be mainly made of a polymer film, and the outer surface of the sealing film may or may not be covered with a layer of metal material. The sealing film may be mainly made of a metal film, and the inner surface of the sealing film may or may not be covered with a layer of polymer material. The main component of the polymer film may be PVC, PP, PE, or PET, etc., and the main component of the polymer material may be hot melt adhesive, twin adhesive, or ultraviolet adhesive, etc. The main component of the metal film may be aluminum foil, tin foil, etc. The liquid storage cylinder 2201 may be sealed against the bottom sealing film 2203 by adhesive materials such as ultraviolet adhesive, double-sided adhesive, hot melt adhesive, etc., and may also be directly sealed by hot pressing, hot melting, ultrasonic welding, optical welding, etc.

Preferably, the liquid release-control unit 2 includes a liquid storage chamber and one liquid flow-control unit 7 connected to the downstream of the liquid storage chamber. The liquid pre-stored in the liquid storage chamber can be transferred to the downstream unit at a specific rotation speed and step by means of a stepwise diversion of the liquid flow-control unit 7 during centrifugal rotation.

Preferably, one liquid flow-control unit 7 is provided between the sample-loading unit 1 and the extraction unit 3. The liquid reagents may be pre-stored in the sample-loading chamber of the sample-loading unit 1. The liquid reagents can be transferred to the downstream unit 3 at a specific rotation speed and step by means of the stepwise diversion of the liquid flow-control unit 7 during centrifugal rotation.

It should be noted that, the liquid flow-control unit 7 can realize the above functions through various structural forms. Specific structures of the liquid flow-control unit 7 are described below.

Figure 12:
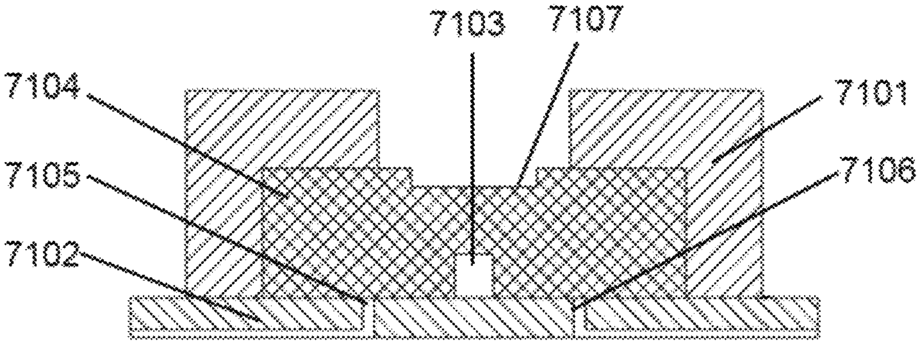
FIG. 12 is a schematic view of an cut-off structure of a rotary opening-closing component according to a specific embodiment of the present application.
Figure 13:
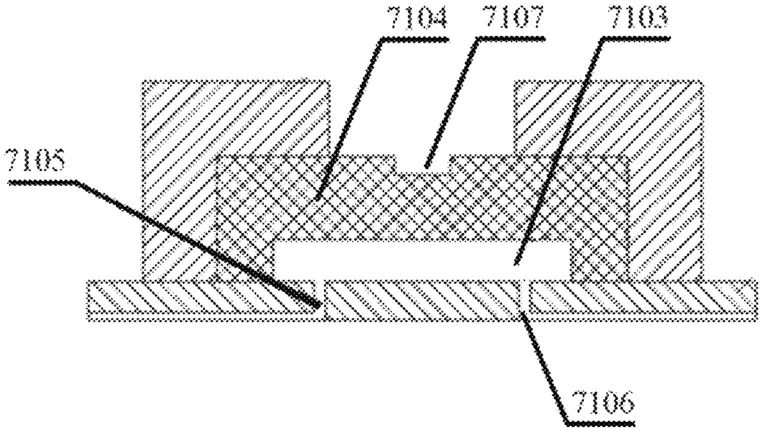
FIG. 13 is a schematic view of a communication structure of the rotary opening-closing component according to a specific embodiment of the present application.

As shown in FIGS. 12 and 13, in a preferred solution, the liquid flow-control unit 7 is a rotary opening-closing component, and the rotary opening-closing component includes a fixed housing 7101, a base 7102 and a cylindrical rotor 7104. The fixed housing 7101 is a cylindrical housing with two open ends, and a lower end of the fixed housing 7101 is fixed on the base 7102. The rotor 7104 rotates around an axis of the rotor itself and cooperates with an inner wall of the fixed housing 7101. A position-limiting structure for limiting the rotor 7104 from coming out is provided at an upper end of the fixed housing 7101, a rotating cooperation structure 7107 for driving the rotor 7104 to rotate is provided at the upper end of the rotor 7104, so that the rotation of the rotor 7104 can be controlled from outside, and a strip-shaped groove 7103 or a counter bore structure is provided at a lower end of the rotor 7104. An upper surface of the base 7102 is closely attached to a lower end surface of the rotor 7104 and is provided with an upstream flat-end pipe 7105 communicating with the upstream unit and a downstream flat-end pipe 7106 communicating with the downstream unit, and the upstream flat-end pipe 7105 and the downstream flat-end pipe 7106 are spaced apart, that is, the two flat-end pipes themselves are not communicated to each other, but can only be communicated through the strip-shaped groove 7103 located on the bottom surface of the rotor 7104.

When the rotor 7104 rotates to a communication position, the strip-shaped groove 7103 communicates the upstream flat-end pipe 7105 with the downstream flat-end pipe 7106; and when the rotor 7104 rotates to an occluded position, the lower end surface of the rotor 7104 cuts off the upstream flat-end pipe 7105 from the downstream flat-end pipe 7106.

The above-mentioned position-limiting structure may be designed in various structural forms. For example, the upper opening of the fixed housing 7101 of the sliding chamber is designed as a funnel structure, and the funnel structure is smaller than the cross section of the rotor 7104, so as to prevent the rotor 7104 from sliding upwards out of the fixed housing 7101; or, a position-limiting stopper is provided inside the upper opening of the fixed housing 7101, so as to prevent the rotor 7104 from falling out.

The method of using the above-mentioned liquid flow-control unit 7 is as follows: when the upstream and downstream liquid paths need to be connected, the rotor 7104 is rotated to the communication position by means of an external device (such as a flat-head screwdriver driven by a motor); when the upstream liquid path needs to be occluded from downstream liquid path, the rotor 7104 is rotated to the occluded position by means of an external device (such as a flat-head screwdriver driven by a motor); and, when the rotor 7104 is in the communication position, the reactor plate 101 is rotated at a certain speed, and the upstream liquid is driven by the centrifugal force to enter the downstream through the liquid flow-control unit 7.

Figure 14:
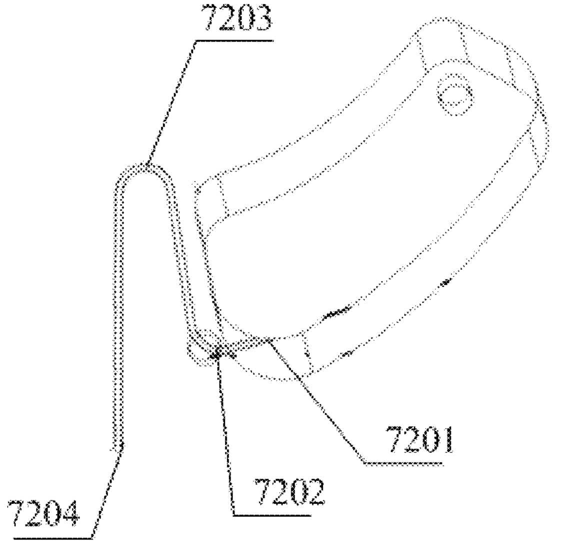
FIG. 14 is a schematic view of a primary siphon structure of a liquid flow-control unit according to a specific embodiment of the present application.

As shown in FIG. 14, in another preferred solution, the liquid flow-control unit 7 is a curved capillary pipe, a pipe inlet 7201 of the capillary pipe is connected with an outlet of the upstream unit (or the liquid chamber) and a pipe outlet 7204 of the capillary pipe is connected with an inlet of the downstream unit. The distance between the pipe outlet 7204 and the chip rotation center 10 is greater than that between the pipe inlet 7201 and the chip rotation center 10, that is, the pipe outlet 7204 is lower than the pipe inlet 7201 (the pipe outlet 7204 is farther from the chip rotation center 10 than the pipe inlet 7201), and the distance between a proximal end 7203 of the capillary pipe and the chip rotation center 10 is smaller than the distance between a proximal end of the upstream unit and the chip rotation center 10, that is, the proximal end 7203 of the capillary pipe (called the apex of the capillary pipe) is higher than the proximal end of the upstream unit (or liquid chamber).

The method of using the liquid flow-control unit 7 of the capillary pipe structure is as follows: when the upstream liquid is not expected to pass through the capillary pipe, the reactor plate is rotated at a certain speed (called flow-limiting rotation speed) to restrict the upstream liquid between the pipe inlet 7201 of the capillary pipe and the apex of the capillary pipe by means of centrifugal force; the upstream liquid automatically fills the entire capillary pipe under the drive of surface tension and reach the pipe outlet 7204 of the capillary pipe, if the rotation is stopped or the rotation speed of the reactor plate is reduced to a certain speed (called free-flow rotation speed), and then the reactor plate is rotated at a certain high speed (called siphon-flow rotation speed), and the upstream liquid is driven by the centrifugal force to enter the downstream through the liquid flow-control unit 7.

It should be noted that, the cross section of the capillary pipe may be rectangular, trapezoidal, semicircular, circular or any other shape, and the equivalent diameter of the cross section of the capillary pipe is between 0.05 mm and 0.5 mm.

In order to obtain a better flow control effect, the inner wall of the capillary pipe or part of the inner wall may be subjected to hydrophilic surface treatment. The effect of the hydrophilic surface treatment is that, for the liquid to pass through the capillary pipe, the contact angle between the fluid and the processed surface is smaller than the contact angle between the fluid and the untreated surface. The treated surface is more unfavorable for the liquid to pass through the capillary pipe under the drive of surface tension. When the inner wall of the capillary pipe is subjected to hydrophilic surface treatment, a solution containing surface active substances is used to infiltrate or spray the inner wall of the pipe. The surface active substances used may be sodium dodecyl sulfate (SDS), polyethylene glycol octyl phenyl ether (TritonX-100), agarose, or specific nanomaterials, etc.

In addition, in order to obtain a better blocking effect, the thicknesses (i.e., equivalent diameter) of the capillary pipe at different positions may be different. In particular, a section of thickened pipe may be provided between the pipe inlet 7201 of the capillary pipe and the proximal end 7203 of the capillary pipe. The thickened pipe is called passive blocker 7202. The passive blocker 7202 serves as a hydrophobic rupturing point on the capillary pipe, and the passive blocker may be in any shape including a circle or a square. Hydrophobic treatment may be carried out in a variety of ways, including but not limited to gas treatment, reagent treatment, and so on. Specifically, the inner wall or part of the inner wall of the passive blocker 7202 on the capillary pipe may be subjected to the hydrophobic surface treatment. The effect of the hydrophobic surface treatment is that, for the liquid to pass through the passive blocker 7202, the contact angle between the fluid and the treated surface is greater than the contact angle between the fluid and the untreated surface. The treated surface of the pipe is more unfavorable for the liquid to pass through the passive blocker 7202 under the drive of surface tension. When the inner wall of the pipe is subjected to hydrophobic surface treatment, a solution or organic solvent containing fluorocarbon or fluorosilane substances is used to infiltrate or spray the inner wall of the pipe. The fluorocarbon or fluorosilane substances used may be polytetrafluoroethylene, trimethylchlorosilane, or specific nanomaterials, etc.

Figure 15:
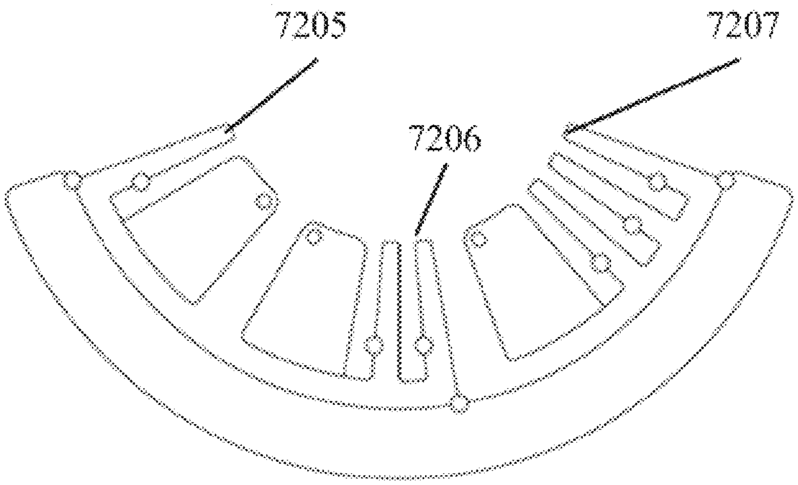
FIG. 15 is a schematic view of a multi-stage siphon structure of the liquid flow-control unit according to a specific embodiment of the present application.

Preferably, the liquid flow-control unit 7 includes multiple capillary pipes connected in series with end to end. As shown in FIG. 15, the liquid flow-control unit may include a primary siphon structure 7205, a secondary siphon structure 7206, and a third-stage siphon structure 7207 connected in series with end to end, thereby forming a multi-stage siphon flow-control unit. The method of using the fluid flow-control unit is as follows: according to the method of using the liquid flow-control unit 7 described above, the reactor plate is rotated at the flow-limiting rotation speed, free-flow rotation speed, and siphon-flow rotation speed in sequence, and the liquid can pass through one stage of the flow-control unit. Repeating the above procedure, the liquid can pass through the multiple stages of the flow-control unit in sequence.

Figure 16:
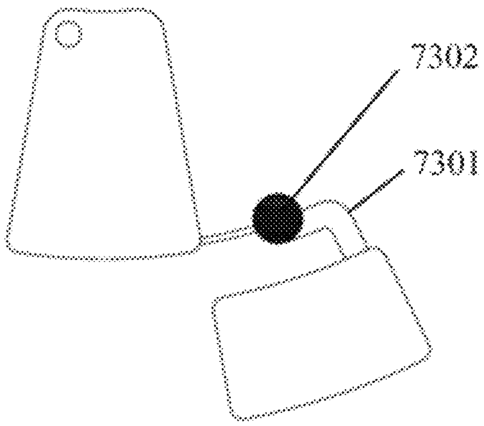
FIG. 16 is a schematic structural view of a hot melt valve of the liquid flow-control unit according to a specific embodiment of the present application.

As shown in FIG. 16, in another preferred solution, the liquid flow-control unit 7 is designed as a hot melt valve, specifically a section of a pipe, a part of the pipe is provided with a local thickened section 7301, and a hot-melt material 7302 is sealed in the local thickened section 7301. Specifically, the liquid flow-control unit 7 is designed as a hot melt valve 7300, and the method of using the hot melt valve is as follows: the liquid flow-control unit 7 is kept closed under initial conditions, and when the upstream and downstream flow paths need to be connected, the position where the pre-buried hot-melt material 7302 is located in the pipeline is heated until the hot-melt material melts, and then the reactor plate is rotated at a predetermined speed, and the melted hot-melt material is driven into the downstream liquid cell by centrifugal force. This section of hot melt material 7302 can be heated by optical means. Preferably, infrared light-emitting diodes or halogen lamps are used as light sources, and light is irradiated to the position of the hot melt material 7302 directly or with the aid of a concave reflector or a convex lens.

Preferably, the aforementioned local thickened section 7301 is located in a rear half of the pipe, and the distance between the local thickened section 7301 and the outlet of the pipe is less than or equal to the length of the local thickened section 7301 itself, so that the volume of the hot melt material is sufficient to seal the pipe, and the part between the local thickened section 7301 and the outlet of the pipe extends in the radial direction of the chip. With this design, the hot melt material can enter the downstream pipe more easily under the action of centrifugal force.

Preferably, the pipe is a straight pipe or a curved pipe, the cross section of the pipe is rectangular, trapezoidal, semicircular or circular, and the equivalent diameter of the cross section of the pipe is 0.2 mm to 2 mm.

Preferably, the melting point of the hot melt material 7302 is between 35° C. and 100° C.

Preferably, the hot-melt material 7302 is a phase change material, which may specifically be paraffin wax.

Figure 17:
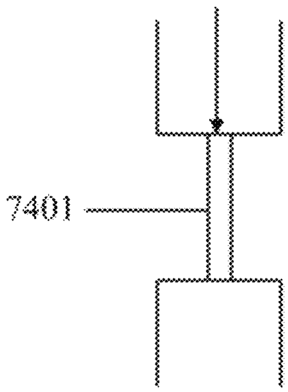
FIG. 17 is a schematic structural view of a flow resistance pipe of a first kind according to a specific embodiment of the present application.
Figure 18:
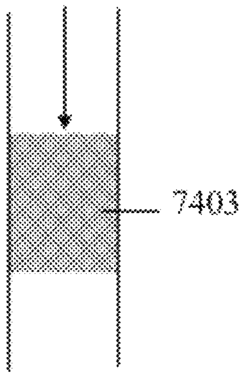
FIG. 18 is a schematic structural view of the flow resistance pipe of a second kind according to a specific embodiment of the present application.

As shown in FIGS. 17 and 18, in another preferred solution, the liquid flow-control unit 7 is a flow resistance valve pipe locally provided with a flow resistance increasing element, and when the liquid pressure in the flow resistance valve pipe is smaller than a conduction hydraulic threshold of the flow resistance increasing element, the flow resistance increasing element prevents the liquid from passing through; and when the liquid pressure in the flow resistance valve pipe is greater than or equal to the conduction hydraulic threshold of the flow resistance increasing element, the flow resistance increasing element allows the liquid to pass through. The method of using the flow-control unit is as follows: when the reactor plate is stationary or rotated at a speed lower than a predetermined speed (called critical speed), the liquid flow-control unit 7 remains closed, and when the upstream and downstream flow paths need to be connected, it is only required to increase the rotation speed of the reactor plate to above the critical speed, so as to open the liquid flow-control unit 7.

As shown in FIG. 17, preferably, the flow resistance increasing element is a flow resistance increasing thin pipe 7401 with an equivalent diameter between 0.1 mm and 1 mm and a length greater than 1 mm. In a case that the downstream chamber of the flow resistance valve pipe is not connected with the upstream chamber of the pipe through a gas path, the air pressure in the downstream chamber prevents the liquid in the upstream chamber from entering the downstream chamber through the flow resistance increasing thin pipe 7401, when the chip is at a lower rotation speed (which means lower centrifugal force); and, after the rotation speed rises above the threshold, the liquid pressure of the upstream chamber increases, compressing the gas in the downstream chamber, and the liquid enters the downstream chamber through the flow resistance increasing thin pipe 7401. This gas-liquid exchange process may not be continuous, just like the liquid outflow process after the mouth of a wine bottle is inverted. This kind of valve can be called "rotation-speed-control burst-valve". The rotation threshold for opening the valve is related to the rotation radius at the valve, and the sectional area and length of the capillary pipe. Different valves have different opening thresholds. In addition, the comb-tooth pipe 7402 in FIG. 1 and the liquid flow-control unit 7 between the lysis unit 12 and the downstream extraction unit 3 in FIG. 5 may both adopt this structure.

As shown in FIG. 18, preferably, the flow resistance increasing element is a porous-material valve 7403 filled and sealed inside the flow resistance valve pipe. The porous-material valve 7403 may be made of filter paper, knitted, or resin material with pores, one or more pieces of the porous material may be provided, and the material may be block-shaped, net-shaped, layer-shaped or sponge-shaped.

Preferably, the porous-material valve is a valve block structure with pores, and the valve block structure includes multiple resin particles, ceramic particles or glass particles. The porous-material valve 7403 may be formed by dense combination of small particle materials, where the small particle materials may be resin, ceramic, glass or the like.

Figure 19:
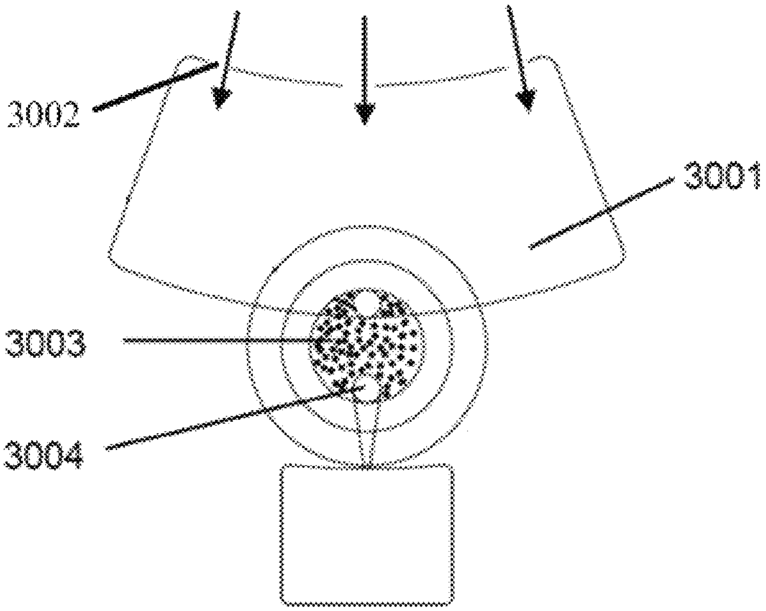
FIG. 19 is a schematic structural view of an extraction unit of a first kind according to a specific embodiment of the present application.

As shown in FIG. 19, preferably, the extraction unit 3 includes an upstream fluid chamber 3001 and a downstream fluid chamber arranged in series, and a porous biomacromolecule absorption material 3003 filled in the downstream fluid chamber. The upstream fluid chamber has multiple fluid inlets 3002, and the downstream fluid chamber has a fluid outlet 3004, and the volume of the upstream fluid chamber 3001 is larger than the maximum value of the volumes of the upstream sample-loading unit 1 and the liquid release-control unit 2. Specifically, the upstream fluid chamber 3001 serves as a buffer chamber at the front end, and the downstream fluid chamber serves as a purification chamber at the rear end. Optionally, the extraction unit consists of one or more fluid chambers connected in series and a porous biomacromolecule absorption material filled in the fluid chamber, where the fluid chamber has an upstream fluid inlet and a downstream fluid outlet.

Figure 20:
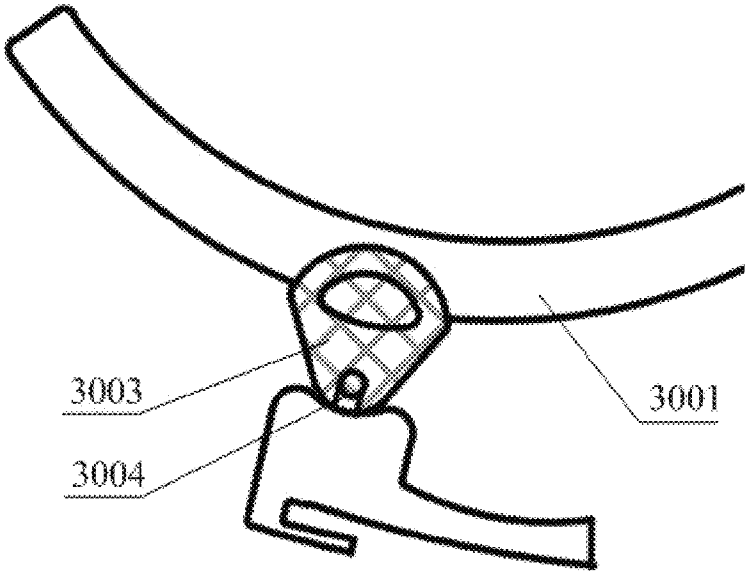
FIG. 20 is a schematic structural view of the extraction unit of a second kind according to a specific embodiment of the present application.

As shown in FIG. 20, preferably, the cross section of the downstream fluid chamber is gradually reduced from the fluid inlet to the fluid outlet 3004 of the downstream fluid chamber, that is, the downstream fluid chamber has a funnel-shaped structure as a whole. In addition, the whole or the outlet end of the buffer chamber and the purification chamber may optionally be a funnel structure, which is more conducive to the discharge of liquid. Preferably, the fluid chamber structure may be a funnel-shaped structure as a whole or have a funnel-shaped outlet end, but the present application is not limited thereto. The upstream of the funnel-shaped structure has a large cross section, and the downstream of the funnel-shaped structure has a small cross section and gradually converges at the fluid outlet 3004.

Preferably, the porous biomacromolecule absorption material 3003 may be, but is not limited to, silica fibers or particles or loose films, ion exchange resins, silica nanoparticles, magnetic particle materials with silica on the surface, porous materials coated with silica nanomaterials on the surface, porous materials coated with chitosan on the surface, or various other porous materials with silanol modification on the surface.

Preferably, the porous biomacromolecule absorption material 3003 is loose-film shaped, lamellar or granular, where the loose film may be a single-layer or multi-layer film, and contain layers of different sizes or particles of different sizes. It should be noted that, the downstream fluid chamber may be filled with porous biomacromolecule adsorption materials 3003 of a same kind, or be filled with porous biomacromolecule adsorption materials of different kinds.

The extraction unit 3 of this design can achieve the nucleic acid purification function in two different ways. Manner A The design of the buffer chamber has the following two functions: 1) When the lysate passes through the purification chamber, the buffer chamber can temporarily store the lysate to prevent the lysate from fleeing to other channels; and 2) When the cleaning solution and the eluent pass through the purification chamber, the cleaning solution and the eluent can be temporarily stored in the buffer chamber, which prevents the fluid flow-control unit 7 from being reversely broken through and prevents the cleaning solution and the eluent from entering the lysis chamber. In the circular purification chamber, a silica gel film is filled in the middle of the chamber as a solid nucleic acid adsorption substrate, so as to effectively capture and release nucleic acids. Manner B The buffer chamber is filled with magnetic beads as the solid nucleic acid adsorption substrate to capture and release nucleic acids, and a filter screen material is filled in the circular purification chamber to prevent the magnetic beads from flowing downstream during centrifugation. The lysis solution and the magnetic beads are sufficiently mixed in the buffer chamber to achieve the nucleic acid adsorption process, and then the target nucleic acid fragments are cleaned through multiple steps of cleaning in turn, and finally, the nucleic acid fragments adsorbed on the surface of the magnetic beads are eluted by the eluent. The above two manners can achieve the nucleic acid purification function.

The method of using the extraction unit 3 includes the following three steps:

a) rotating the reactor plate at a predetermined speed, allowing the solution a containing the biological macromolecules to be extracted (called target molecules) and the adsorption-promoting components to enter the extraction unit 3 from the upstream sample-loading unit 1 under the drive of centrifugal force, and to flow through the porous biomacromolecule adsorption material 3003 filled in the downstream fluid chamber, where the biological macromolecules are adsorbed on the surface of the porous biological macromolecule adsorption material 3003, and the remaining components in the solution flow downstream and flow to the liquid collection unit 5 under the control of the downstream liquid switch-control unit 4;

b) opening one upstream liquid release-control unit 2, and then rotating the reactor plate at a predetermined speed, allowing the solution b containing the cleaning components to enter the extraction unit 3 from the upstream liquid release-control unit 2 under the drive of centrifugal force, and to flow through the porous biomacromolecule adsorption material 3003 filled in the fluid chamber, where the solution b washes away the impurities that may remain in the porous biomacromolecule adsorption material 3003 and the solution a of the downstream fluid chamber, and all the liquid flows downstream and flows to the liquid collection unit 5 under the control of the downstream liquid switch-control unit 4 after passing through the porous material, and if necessary, this step may be repeated for 1 to 2 times to get a better cleaning effect;

c) opening one upstream liquid release-control unit 2, and then rotating the reactor plate at a predetermined speed, allowing the solution c containing the eluent components to enter the extraction unit 3 from the upstream liquid release-control unit 2 under the drive of centrifugal force, and to flow through the porous biomacromolecule adsorption material 3003 filled in the fluid chamber, where the target molecules adsorbed on the surface of the porous adsorption material are desorbed from the surface of the material and flow downstream with the solution c, and then flow to the liquid transfer unit 6 under the control of the downstream liquid switch-control unit 4.

It should be noted that the function of the liquid switch-control unit 4 is to switch the flow direction of the liquid transferred from the upstream unit, so that different liquids can be transferred to different downstream units.

Figure 21:
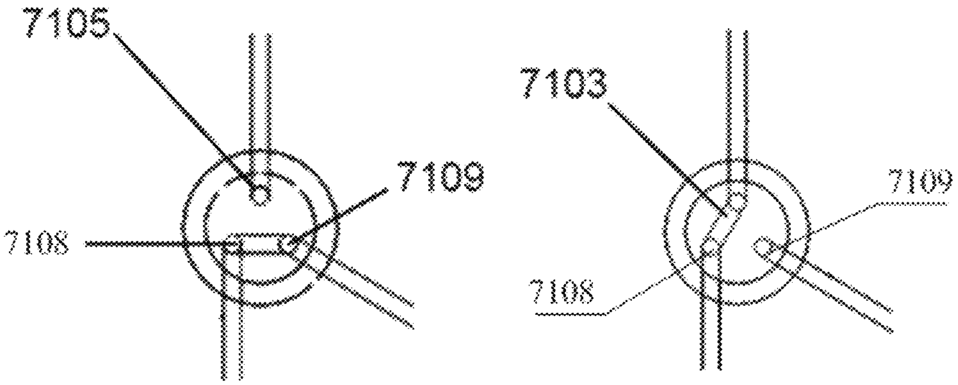
FIG. 21 is a schematic structural view of the off state and the on state of the rotary opening-closing component according to a specific embodiment of the present application.

Referring to FIGS. 12, 13 and 21, preferably, the liquid switch-control unit 4 is a rotating switch assembly 7100, and the rotating switch assembly 7100 includes a fixed housing 7101, a base 7102 and a cylindrical rotor 7104. The fixed housing 7101 is a cylindrical housing with two open ends, a lower end of the fixed housing 7101 is fixed on the base 7102, and the rotor 7104 rotates around an axis of the rotor itself and cooperates with an inner wall of the fixed housing 7101. A position-limiting structure for limiting the rotor 7104 from coming out is provided at an upper end of the fixed housing 7101. A rotating cooperation structure 7107 for driving the rotor 7104 to rotate is provided at the upper end of the rotor 7104, and a strip-shaped groove 7103 is provided at the lower end of the rotor 7104. The upper surface of the base 7102 is closely attached to the lower end surface of the rotor 7104, and is provided with an upstream flat-end pipe 7105 communicating with the upstream unit and a first downstream flat-end pipe 7108 and a second downstream flat-end pipe 7109 respectively communicating with two downstream units, and the upstream flat-end pipe and the two downstream flat-end pipes are spaced apart.

When the rotor 7104 rotates to a first communication position, the strip-shaped groove 7103 communicates the upstream flat-end pipe 7105 with the first downstream flat-end pipe 7108;

when the rotor 7104 rotates to a second communication position, the strip-shaped groove 7103 communicates the upstream flat-end pipe 7105 with the second downstream flat-end pipe 7109; and when the rotor 7104 rotates to an occluded position, the lower end surface of the rotor 7104 cuts off the upstream flat-end pipe 7105.

The method of using the liquid switch-control unit 4 is as follows: the reactor plate is kept stationary, a suitable external manipulator is inserted from the open recess on an upper portion of the rotating switch assembly into the rotating cooperation structure 7107 of the cylindrical rotor 7104, and the rotor 7104 is rotated to the first communication position, and the flat-end pipe 7105 leading to the upstream is communicated to the first downstream flat-end pipe 7108 leading to the downstream through the strip-shaped groove 7103 on the bottom surface of the rotor 7104, so that the upstream unit is communicated to one downstream unit; and then, the reactor plate is rotated at a predetermined speed, and the upstream liquid can enter the selected downstream channel through the liquid switch-control unit 4; and when the downstream channel needs to be switched, the rotor 7104 is rotated to the communication position of the downstream second downstream flat-end pipe 7109 according to the above method, so that the upstream unit is communicated to the downstream unit on another side.

Figure 22:
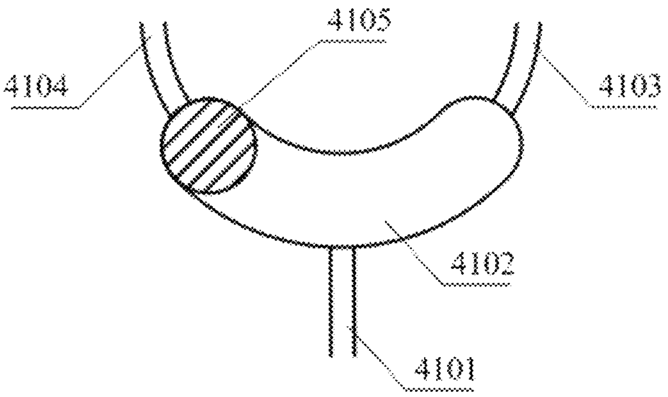
FIG. 22 is a schematic structural view of a magnetic control valve of a liquid switch-control unit according to a specific embodiment of the present application.

Referring to FIG. 22, in another preferred solution, the liquid switch-control unit 4 is designed as a magnetic control valve structure, which specifically includes an arc-shaped pipe 4102 and a ferromagnetic ball 4105 made of ferromagnetic material inside the arc-shaped pipe 4102. The centerline of the arc-shaped pipe 4102 is arc-shaped and the middle of the arc-shaped pipe 4102 protrudes toward the chip rotation center 10. The cross section of the arc-shaped pipe 4102 is circular, and the proximal end of the arc-shaped pipe 4102 is provided with a liquid inlet for communicating with the upstream unit, that is, the magnetic control valve liquid inlet 4101 shown in FIG. 22. Two liquid outlets are respectively provided at two distal ends of the arc-shaped pipe 4102, which are the first liquid outlet 4103 and the second liquid outlet 4104 of the magnetic control valve, respectively. The ferromagnetic ball 4105 is in sealing contact with the inner wall of the arc-shaped pipe 4102 and is configured to slide back and forth between the two distal ends of the arc-shaped pipe 4102 to block the liquid outlet.

The method of using the above-mentioned magnetic control valve structure is as follows: an external magnet is brought close to the surface of the reactor plate, and the reactor plate is slowly rotated to cause the ferromagnetic ball 4105 in the arc-shaped pipe 4102 of the liquid switch-control unit 4 to approach the external magnet and be attracted by the external magnet, and then the reactor plate is further rotated to cause the ferromagnetic ball 4105 to be pulled by the magnet to the first liquid outlet 4103 of the magnetic control valve of the arc-shaped pipe 4102; then the reactor plate is rotated at high speed in the same direction, the ferromagnetic ball 4105 compresses and seals the outlet under the action of centrifugal force, the upstream liquid enters the arc-shaped pipe 4102 under the action of centrifugal force and flows to the downstream channel through the second liquid outlet 4104 of the magnetic control valve; and when the downstream channel needs to be switched, the ferromagnetic ball 4105 is moved to the second liquid outlet 4104 of the magnetic control valve according to the above method and the reactor plate is rotated.

Figure 23:
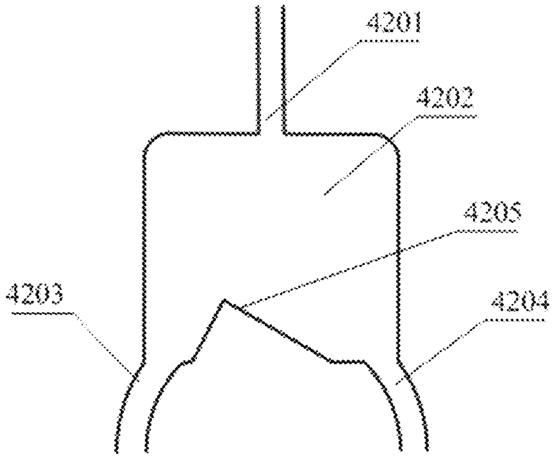
FIG. 23 is a schematic structural view of a Coriolis valve of the liquid switch-control unit according to a specific embodiment of the present application.

Referring to FIG. 23, in another preferred solution, the liquid switch-control unit 4 adopts a Coriolis valve structure and includes a deflection cavity 4202. A liquid inlet, that is, the Coriolis valve liquid inlet 4201, communicating with the upstream unit is provided in the middle of the proximal end of the deflection cavity 4202, and two liquid outlets, that is, the first liquid outlet 4203 of the Coriolis valve and the second liquid outlet 4204 of the Coriolis valve, communicating with the downstream unit are respectively provided at the left and right sides of the distal end of the deflection cavity 4202. The deflection cavity 4202 has certain dimensions in the radial direction of the reactor plate, the normal direction of the reactor plate, and the direction perpendicular to the reactor plate.

The method of using the above Coriolis valve structure is as follows: the reactor plate is rotated clockwise at a certain speed (viewed from the top of the chip), and the upstream liquid enters the deflection cavity 4202 from the Coriolis valve liquid inlet 4201 and deflects to the right under the combined action of centrifugal force and Coriolis force (viewed from above), and enters the downstream channel from the right outlet of the deflection cavity; or the reactor plate is rotated counterclockwise at a certain speed (viewed from the top of the chip), and the upstream liquid enters the deflection cavity 4202 from the Coriolis valve liquid inlet 4201 and deflects to the left under the combined action of centrifugal force and Coriolis force (viewed from above), and enters the downstream channel from the left outlet of the deflection cavity 4202.

Preferably, the dimension of the deflection cavity 4202 in a radial direction of the chip ranges from 1 mm to 10 mm, the dimension in a normal direction of the chip ranges from 1 mm to 10 mm, and the dimension in a direction perpendicular to a plane of the reactor ranges from 0.2 mm to 5 mm Preferably, the equivalent diameter of the cross section of the liquid inlet of the deflection cavity 4202 ranges from 0.1 mm to 1 mm.

Preferably, a deflection structure 4205 protruding toward the inner side of the deflection cavity 4202 is provided at one side of the deflection cavity 4202 away from the chip rotation center 10, and the deflection structure 4205 is toward one of the liquid outlets relative to the midpoint position of the two liquid outlets. The deflection structure 4205 forms an asymmetrical hillside shape with high middle and low sides at the bottom of the deflection cavity 4202. This configuration can further reduce the interference of external uncertain factors on the liquid flow direction, and ensure that the liquid is deflected to the designated side and the reaction proceeds normally.

Preferably, the contact angle between the inner surface of the deflection cavity 4202 and the liquid flowing therethrough is greater than 55 degrees. The effect of the contact angle between the inner surface of the deflection cavity 4202 and the passing-by liquid is obtained by appropriate chemical treatment on the inner surface of the cavity.

It should be noted that, although the above-mentioned various liquid switch-control units 4 have different structures, they all have the same function. The upstream of these liquid switch-control units is connected to the extraction unit 3, and the downstream of these liquid switch-control units can be switched between the liquid collection unit 5 and the liquid transfer unit 6, or can be switched between the liquid collection unit 5 and the pre-amplification unit.

It should be noted that, the liquid collection unit 5 includes a liquid storage chamber, a liquid storage inlet communicating with the upstream unit is provided at the top of the liquid storage chamber, and the volume of the liquid storage chamber is larger than the sum of the volumes of the upstream sample-loading unit 1 and the upstream liquid release-control unit 2.

The liquid storage chamber may be designed as C-shaped. The liquid storage chamber may be connected to the upstream liquid release-control unit 2 through the pipe. The pipe can exhaust gas while the upstream liquid enters the liquid storage chamber. The liquid storage chamber is prefilled with a liquid absorbing material. The liquid absorbing material may be sponge, absorbent cotton, water-absorbing resin particles, dehydrated agarose gel particles, or other water-absorbing agents or porous liquid-absorbing materials.

The liquid transfer unit 6 includes a hollow chamber. The upstream of the hollow chamber is connected to one outlet of the liquid switch-control unit 4, and the downstream of the hollow chamber is connected to the liquid flow-control unit 7. The liquid transfer unit 6 may or may not contain an overflow chamber connected in parallel with the hollow chamber. The liquid transfer unit 6 may be connected to one or more upstream liquid release-control units 2 through the pipe. The pipe can exhaust gas while the upstream liquid enters the hollow chamber. The method of using the liquid transfer unit is as follows: the liquid flowing out of the liquid switch-control unit 4 is temporarily stored, the overflow chamber in the liquid transfer unit 6 can selectively discard or quantify the liquid, or, the liquid in the transfer unit can be uniformly mixed with the pre-buried nucleic acid amplification reagent by changing the centrifugal rotation speed; and the liquid transfer unit 6 releases the liquid to the liquid quantitative dispersion unit 8 through the liquid flow-control unit 7.

Preferably, reagents that can be used for subsequent reactions are pre-buried in the above-mentioned hollow chamber, and the form of the reagents may be ointment, dry powder, granular, block or film. The reagents pre-buried in the hollow chamber are other effective reagent components or part of components required for nucleic acid amplification reactions except primers and templates.

Figure 3:
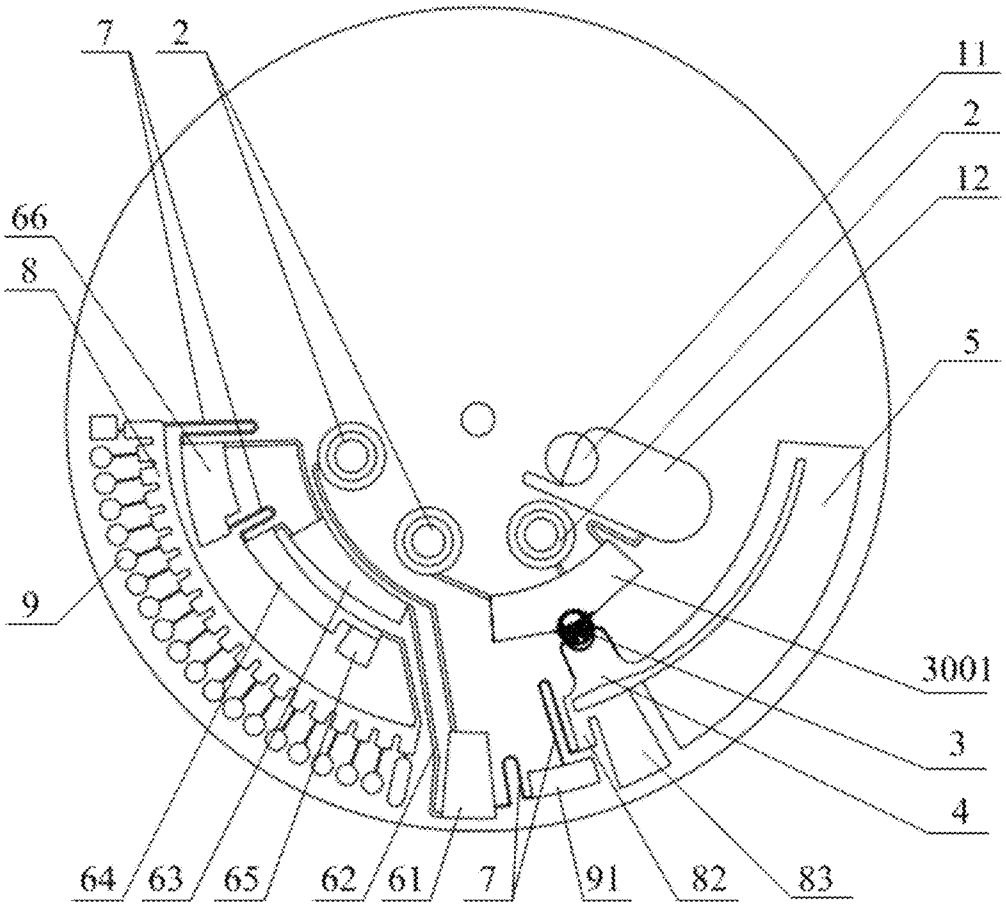
FIG. 3 is a schematic structural diagram of the chip according to a third embodiment of the present application.
Figure 4:
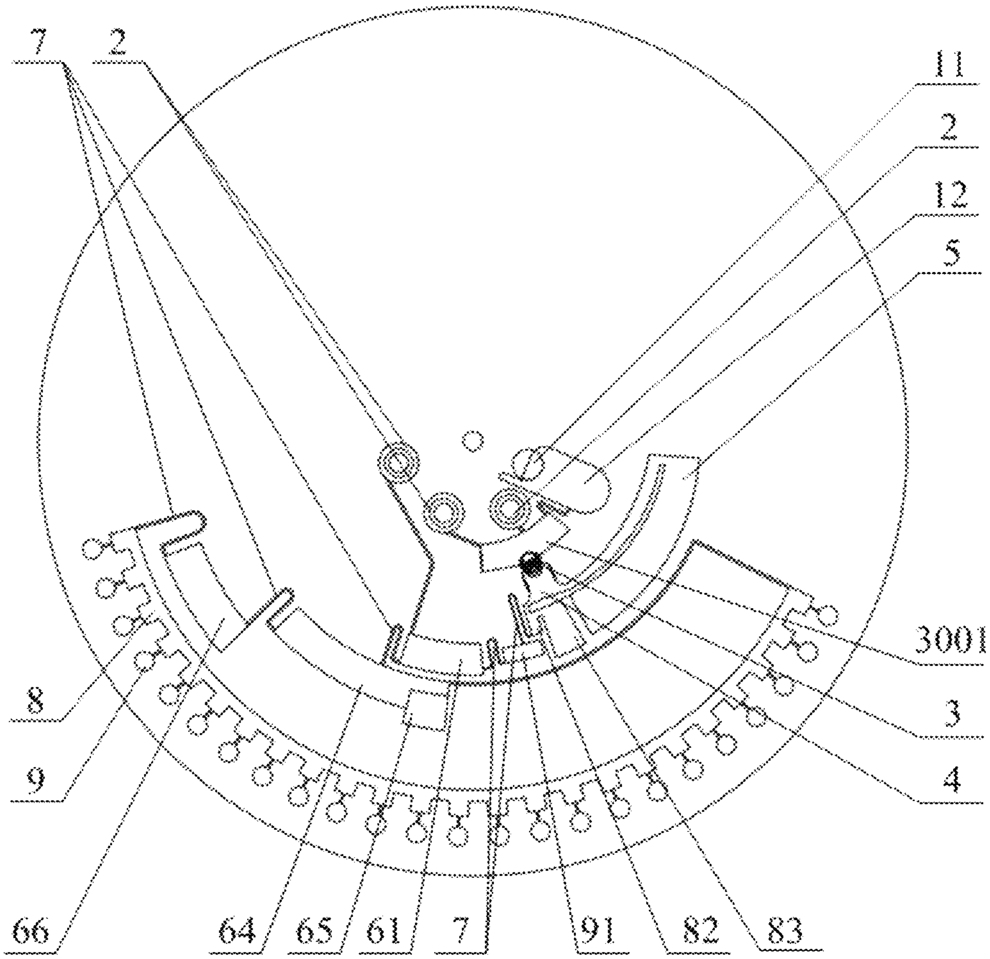
FIG. 4 is a schematic structural diagram of the chip according to a fourth embodiment of the present application.

It should be noted that the structure and arrangement of the liquid transfer unit 6 may have various forms. On the chip that requires the pre-amplification reaction, the liquid transfer unit 6 includes a hollow chamber 61, a product-transfer quantifying unit and a mixing chamber 66, the downstream of the pre-amplification unit is in communication with the hollow chamber 61 through the liquid flow-control unit 7, and the downstream of the hollow chamber 61 is connected with the product-transfer quantifying unit; the product-transfer quantifying unit is connected with the mixing chamber 66 through the liquid flow-control unit 7, and the downstream of the mixing chamber 66 is in communication with the downstream liquid quantitative dispersion unit 8 through the liquid flow-control unit 7. As shown in FIG. 4, the hollow chamber 61, the product-transfer quantifying unit, and the mixing chamber 66 are arranged in sequence from the inside to the outside along the radial direction of the chip. In this embodiment, the product-transfer quantifying unit only includes a product-quantifying chamber 64 located at the downstream of the hollow chamber 61 and a product-overflow chamber 65 connected in parallel with the product-quantifying chamber 64, the downstream of the hollow chamber 61 is connected with the product-quantifying chamber 64 through the liquid flow-control unit 7, and the downstream of the product-quantifying chamber 64 is connected with the mixing chamber 66 through the liquid flow-control unit 7. This configuration of the liquid transfer unit 6 needs to occupy a relatively large space in the radial direction of the chip, which results in a large chip diameter. In a preferred solution, in order to further reduce the size of the chip and allow the liquid transfer unit 6 to make full use of the radial space of the chip, the product transfer quantitative unit in this solution includes a transfer chamber 63 and a product-quantifying chamber 64, and the transfer chamber 63 is arranged at a position closer to the chip rotation center 10 of the chip than the hollow chamber 61. As shown in FIG. 3, the bottom outlet of the hollow chamber 61 is connected to the top of the transfer chamber 63 through a liquid transfer channel 62, the liquid transfer channel 62 in this embodiment adopts a siphon pipe, and the liquid in the hollow chamber 61 is all transferred to the transfer chamber 63 under the action of capillary force, so as to complete the transfer of the liquid from the distal end to the proximal end of the chip, thereby greatly reducing the size of the chip disc and improving the radial space utilization rate of the chip.

Figure 5:
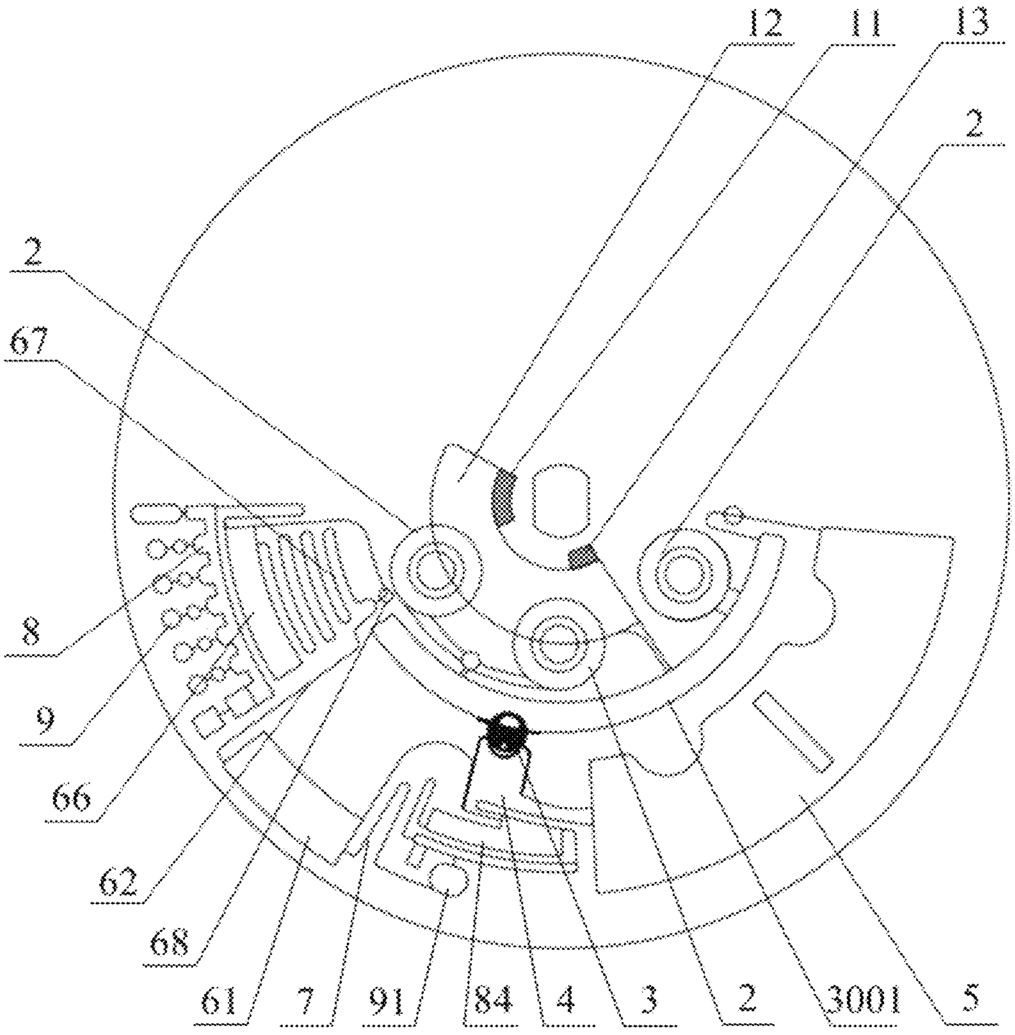
FIG. 5 is a schematic structural diagram of the chip according to a fifth embodiment of the present application.

In another preferred solution, as shown in FIG. 5, the product-transfer quantifying unit includes a serpentine pipe 67, and the distance between the serpentine pipe 67 and the chip rotation center 10 is smaller than the distance between the hollow chamber 61 and the chip rotation center 10, that is, the serpentine pipe 67 is arranged closer to the chip rotation center than the hollow chamber 61. The bottom outlet of the hollow chamber 61 is connected to the top of the serpentine pipe 67 through the liquid transfer channel 62, and the bottom outlet of the serpentine pipe 67 is connected to the mixing chamber 66, where part of the liquid in the hollow chamber 61 is transferred to the serpentine pipe 67 under the action of the capillary force of the liquid transfer channel 62, so as to complete the transfer of the liquid from the distal end to the proximal end of the chip, thereby greatly reducing the size of the chip and improving the space utilization rate of the chip. Besides, the liquid is transferred and quantified in the serpentine pipe 67, and enters the mixing chamber 66, and then is mixed with the pre-stored reagents in the mixing chamber 66.

It should be noted that, the serpentine pipe 67 has a larger cross section than the capillary pipe, and not only serves as a liquid transfer channel, but also has the function of quantifying liquid. The specific working principle of the serpentine pipe is that, in a case that the liquid has a certain affinity with the surface, the surface tension drives the liquid from the upstream hollow chamber 61 into the liquid transfer channel 62 and the serpentine pipe 67 and drives the liquid to further advance to another side of the serpentine pipe 67. By pre-designing the length and cross section of the serpentine pipe 67, the volume of liquid entering the serpentine pipe 67 can be determined. The junction between the liquid transfer channel 62 and the serpentine pipe 67 is located at the highest point of the entire pipe, and is provided with three fork pipes, one of which is connected to the gas path and is subjected to hydrophobic treatment to prevent liquid from entering. After the liquid fills up the liquid transfer channel 62 and the serpentine pipe 67, the liquid is disconnected at the three-fork junction at the highest point of the serpentine pipe 67 by means of centrifugation at high speed, where the quantified liquid in the serpentine pipe 67 enters the downstream mixing chamber 66 under the drive of centrifugal force, and till then the serpentine pipe 67 completes the function of quantifying and transferring liquid.

Figure 8:
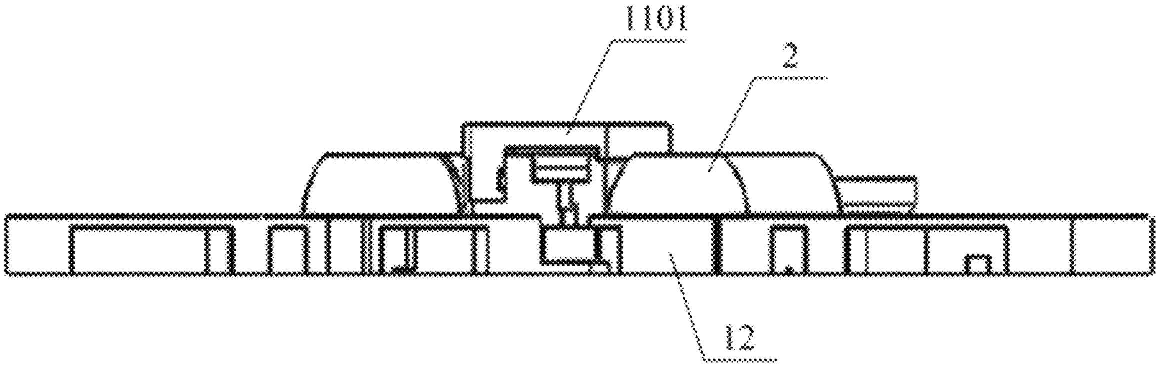
FIG. 8 is a schematic diagram of a lysis unit located below a liquid release-control unit according to a specific embodiment of the present application.

In order to further reduce the diameter of the chip, in a preferred solution, the lysis unit 12 overlaps part of the liquid release-control unit 2 in the radial direction of the chip, and the lysis unit 12 is located below the liquid release-control unit 2. As shown in FIG. 8, a sample-loading cover 1101 is provided above the sample inlet 11. For the structure of the sample-loading cover 1101, reference may be made to the relevant introduction of the sample-loading unit 1 described above. The sample-loading cover 1101 preferably seals the sample inlet 11 by means of snap-locking. The bottom of the sample-loading cover 1101 is in communication with the lysis unit 12, and the lysis unit 12 is arranged inside the reactor plate 101 and is located below part of the liquid release-control unit 2. With this arrangement, the lysis unit 12 and the liquid release-control unit 2 are arranged up and down in the vertical direction of the reactor plate 101, and the overlap portion between the two can further reduce the radial size of the chip and improve space utilization rate.

The liquid quantitative dispersion unit 8 is a section of liquid distribution chambers with multiple convex-concave-convex structures connected end to end on the outside and distributed in the circumferential direction as a whole, where the recess of each of the convex-concave-convex structures, other than the first one and the last one, is connected to the reaction cell 9 through the comb-tooth branch pipe 7402; and the recess structure formed by each convex-concave-convex structure is called weighing cell 8001, and a cell connected to the last weighing cell through the comb-tooth branch pipe 7402 is called waste liquid cell.

Another structure of the liquid quantitative dispersion unit 8 is as follows: the liquid quantitative dispersion unit 8 is a section of liquid distribution and quantification chambers 8001 with multiple peak-valley-peak structures connected end to end and curved in an arc shape as a whole, where the valley of each of the peak-valley-peak structures, other than the last one, is connected with one comb-tooth branch pipe 7402 and is connected to one reaction cell 9 through the comb-tooth branch pipe 7402; The peak-valley-peak structure is also called the weighing cell 8001.

The front end of the liquid distribution chamber is connected with the liquid outlet of the upstream liquid transfer unit 6 through the liquid flow-control unit 7, and the tail end of the liquid distribution chamber is finally connected with the upstream liquid transfer unit 6 through a section of exhaust pipe to exhaust.

The ratio of the volume of the last weighing cell 8001 of the liquid distribution chamber to the volume of the other weighing cells 8001 is greater than two. The last weighing cell 8001 of the liquid distribution chamber can be connected to a liquid storage cell through a section of pipe for storing excess liquid.

Preferably, the junction point of the comb-tooth branch pipe 7402 and the reaction cell 9 is located on the line connecting the chip rotation center 10 of the reactor 100 and the center of the reaction cell 9, that is, the comb-tooth branch pipe 7402 extends along the radial direction of the chip, which helps the liquid to transfer smoothly.

Preferably, the cross section of the comb-tooth branch pipe 7402 may be rectangular, trapezoidal, semicircular, circular or any other shape, and the dimension of the cross section of the comb-tooth branch pipe is between 0.05 mm and 1 mm.

Figure 24:
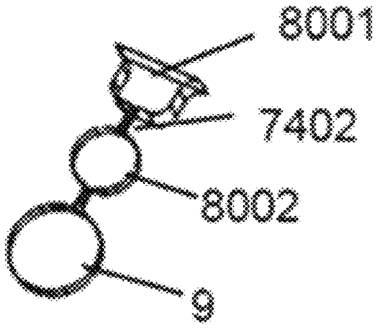
FIG. 24 is a schematic structural view of a communication structure between a weighing cell and a reaction cell according to a specific embodiment of the present application.

As shown in FIG. 24, the comb-tooth branch pipe 7402 is provided with a liquid cell called buffer cell 8002. The cross sectional area of the buffer cell 8002 is larger than the cross sectional area of the comb-tooth branch pipe 7402, and the buffer cell 8002 is penetrated by the comb-tooth branch pipe 7402. The maximum cross sectional size of the buffer cell 8002 is 3 to 10 times the cross sectional size of the comb-tooth branch pipe 7402.

Preferably, at least three reaction cells 9 are provided on one reactor, and these reaction cells 9 are equally spaced on a circular arc centered on the center of the chip; Each reaction cell 9 has only one liquid inlet, and is connected to one comb-tooth branch pipe 7402 through the inlet.

Preferably, the volume of the reaction cell 9 is between 0.1 μl and 10 μl. Reagents related to the reactions are pre-buried in the above-mentioned reaction cell 9, and the form of the reagents may be ointment, dry powder, granular, block or film. The reagents pre-buried in the reaction cell 9 are primers related to the nucleic acid amplification reaction, and may or may not contain other auxiliary components.

In addition, it should be noted that in the whole-process biological detection device provided by this solution, while the centrifugal force drives the liquid to transfer between the upstream unit and the downstream unit, in order to ensure the balance of the gas path between the upstream and downstream units, a variety of gas-path balance pipelines between the upstream and downstream units are further provided according to this solution, such as the vent hole 13 at the top of the lysis unit 12 and the branch gas path 68 at the top of the serpentine pipe 67 shown in FIG. 5. Other gas-path balance pipelines and vent holes can be designed according to specific needs, and will not be repeated herein.

The use process of the whole-process biological detection device provided by this solution is described with reference to the following four embodiments.

Embodiment 1: Nucleic Acid Extraction and Constant-Temperature Amplification Detection Based on the Whole-Process Biological Detection Device Nucleic acid is the carrier of genetic information, the most important biological information molecule, and the main object of molecular biology research. At present, nucleic acid constant-temperature amplification technology, as a molecular biology detection technology, has the characteristics of high specificity, high sensitivity, fast response speed and low instrument cost, and has been widely used in the diagnosis of clinical diseases, the qualitative and quantitative detection of epidemic bacteria or viruses, and the development of gene chips. The application of LAMP in various fields has increased, and the demand for integrated devices for nucleic acid extraction, purification, and detection is also higher. A microfluidic biochip that integrates nucleic acid extraction, purification, constant temperature amplification and result detection. The whole process can be automatically executed in the chip under the cooperation of supporting instrument by adding the sample once, and can realize high-efficiency and rapid detection of nucleic acid in a "sample in and result out" manner.

Referring to FIG. 1, the whole-process biological detection device provided by the present application is a kind of biological detection chip that can perform nucleic acid extraction and constant-temperature amplification (such as loop-mediated isothermal amplification method, LAMP) or any other constant-temperature amplification technology. The reaction plate chip is mainly composed of the sample inlet 11, the lysis unit 12, the liquid flow-control unit 7 (flow resistance valve), the liquid release-control unit 2, the extraction unit 3 (nucleic acid purification region), the liquid switch-control unit 4 (Coriolis valve), the liquid collection unit 5 (waste liquid cell), the liquid transfer unit 6 (recovery cell), the liquid flow-control unit 7 (siphon structure), the liquid quantitative dispersion unit 8, the reaction cell 9, and the chip rotation center hole. The lysis unit 12 has the sample inlet 11, and the pipelines between the lysis unit 12, the liquid release-control unit 2 and the nucleic acid purification region are a circulation gas path and the flow resistance valve on the upper side of the nucleic acid purification region. The lysis unit 12 is used as a temporary storage region for the sample, and can perform chemical or physical treatment to a certain degree on the sample. Lysis solution a is added to the lysis unit 12 from the sample inlet 11. The liquid release-control unit 2 serves as a reagent pre-storage region to pre-store a cleaning solution reagent pack b and an eluent reagent pack c, and the cleaning solution reagent pack b and the eluent reagent pack c are packaged on the chip by means of glue. The lysis unit 12, the liquid release-control unit 2 and the nucleic acid purification region are connected by the flow resistance valve pipeline. The nucleic acid purification region pre-stores silicon films that can absorb and release nucleic acids, and there films are packaged by welding or gluing. After liquid separation by the liquid switch-control unit 4 (Coriolis valve), the purified nucleic acid samples can be collected in the liquid transfer unit 6 (recovery cell), and then the liquid is allotted to the weighing cells 8001 of the liquid quantitative dispersion unit 8 by centrifugation through the primary siphon pipe, and the allotted samples can be further subjected to chemical or physical treatment during the centrifugation process. The liquid in the weighing cell 8001 is centrifuged at high speed and flows through the comb-tooth branch pipe 7402 to reach the reaction cell 9. The reaction cell 9 is the position where the pretreated sample reacts and produces the final product.

As shown in FIG. 1, the sample is added to the lysis unit 12 through the sample inlet 11, and then the sample inlet 11 is closed. A rotating motor is used to provide centrifugal force as a drive to drive the liquid in the lysis unit 12 to the extraction unit 3 (nucleic acid purification region), while the air in the lysis unit 12 forms an internal air circulation through the pipe and reaches a balanced state. At this time, driven by centrifugation, the chip is rotated counterclockwise at high speed (7000 rpm~9000 rpm) for 1 min to 2 min, and the liquid enters the waste liquid cell of the liquid collection unit 5 through the extraction unit 3 (nucleic acid purification region) and the liquid switch-control unit 4 (Coriolis valve), and is then absorbed and trapped by the pre-placed water-absorbing material.

After all the liquid in the lysis unit 12 is released, the tough upper cover 2101 of the liquid storage sac containing the cleaning liquid reagent pack b is squeezed by external mechanical force, the liquid storage sac is compressed to cause the pressure of the internal cleaning liquid reagent to rise, and the brittle bottom bracket 2103 of the liquid storage sac deforms outward due to the pressure of the internal cleaning liquid reagent and ruptures at the cutting edge due to the cutting action of the cutting edge of the pressure-bearing platform 2104, and the cleaning liquid reagent in the liquid storage sac enters the diversion groove 2102 below from the breach; and, under the action of low centrifugal force, most or all of the cleaning liquid reagent in the liquid storage sac is released into the diversion groove 2102, and all the liquid enters the downstream unit under the drive of counterclockwise high-speed (7000 rpm~9000 rpm) centrifugation (for 1 min~2 min), and then enters the waste liquid cell through the nucleic acid purification region and the Coriolis valve, and finally gets absorbed and trapped. The liquid storage sac containing the eluent reagent pack c is squeezed in the same method as above, and the liquid enters the liquid transfer unit 6 (recovery cell) through the nucleic acid purification region and the Coriolis valve under the drive of clockwise high-speed (7000 rpm~9000 rpm) centrifugation (for 1 min~2 min). During the high-speed centrifugation process of the biological reagent, the gas pipeline on the upper side of the nucleic acid purification region is connected with the gas pipeline of the recovery cell to realize balance of gas-liquid exchange inside the chip.

During the high-speed centrifugation process of the purified nucleic acid sample collected in the liquid transfer unit 6 (recovery cell), the liquid remains between the capillary pipe inlet of the liquid flow-control unit 7 (siphon structure) and the apex (proximal end) of the liquid flow-control unit. When the rotation, that is, the centrifugation ends, the purified nucleic acid sample liquid automatically fills the entire capillary pipe and reaches the outlet of the capillary pipe under the drive of the liquid surface tension. During low-speed (1000 rpm-2000 rpm) centrifugation (for 1 min to 2 min), the purified nucleic acid sample liquid enters the downstream weighing cell 8001 through the liquid flow-control unit 7 by means of centrifugal force. Centrifugation at low speed less than 1000 rpm (for 1 min to 3 min) causes the liquid in the weighing cell 8001 to fully contact and mix with the LAMP system, and then centrifugation at high speed (7000 rpm to 9000 rpm) causes the liquid in the weighing cell 8001 to flow through the comb-tooth branch pipe 7402 to reach the reaction cell 9, and to be mixed with reagents such as specific primers pre-buried in the reaction cell 9. Under the action of an external temperature control module, a real-time fluorescent LAMP amplification detection reaction is performed.

The permutation and combination of various functional modules can achieve the above functions.

Embodiment 2: Nucleic Acid Extraction and PCR Amplification Detection Based on the Whole-Process Biological Detection Device The whole-process biological detection device of the present application can adopt the principle of nucleic acid amplification based on polymerase chain reaction technology (PCR), and integrate a series of processes of sample lysis, nucleic acid purification, and PCR amplification to realize the nucleic acid amplification and detection in the "sample in and result out" manner.

Figure 2:
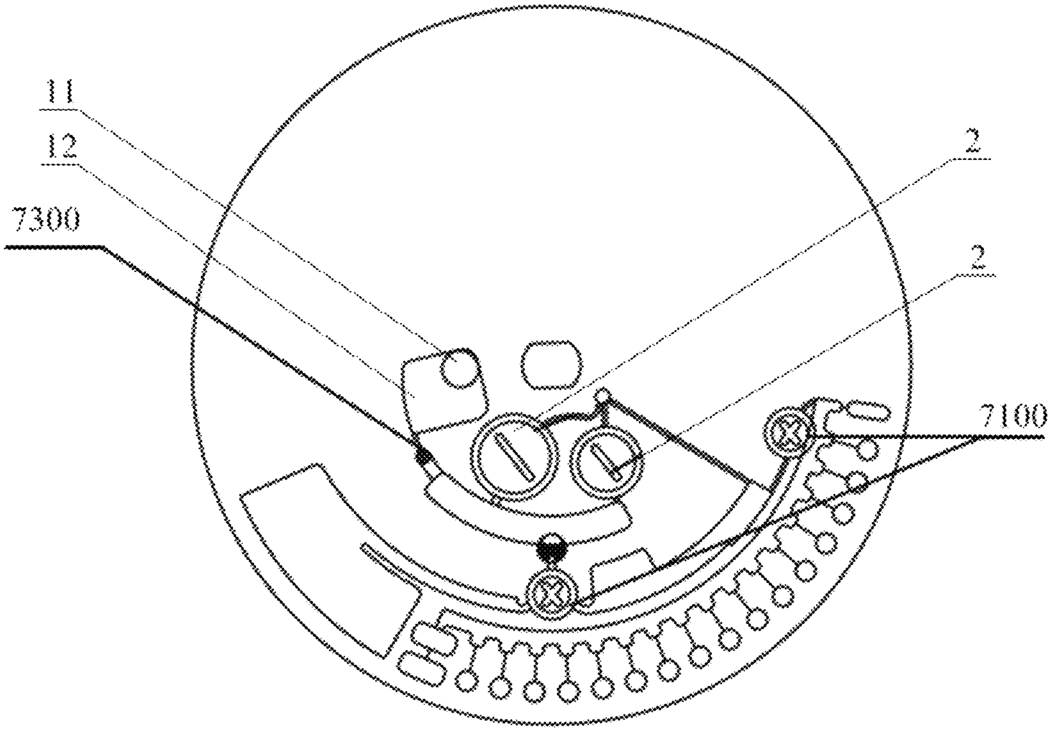
FIG. 2 is a schematic structural diagram of the chip according to a second embodiment of the present application.

Referring to FIG. 2, the whole-process biological detection device provided by the present application is a kind of biological detection chip that can perform nucleic acid extraction and PCR amplification reaction. The reaction plate chip is mainly composed of the sample inlet 11, the lysis unit 12, the liquid flow-control unit 7 (hot melt valve 7300), the liquid release-control unit 2 (liquid storage cylinder structure), the extraction unit 3 (nucleic acid purification region), the liquid switch-control unit 4 (rotating switch assembly 7100), the liquid collection unit 5 (waste liquid cell), the liquid transfer unit 6 (recovery cell), the liquid flow-control unit 7 (rotating switch assembly 7100), the liquid quantitative dispersion unit 8, the reaction cell 9, and the chip rotation center hole. The lysis unit 12 is used as a temporary storage region for the sample, and can perform chemical or physical treatment to a certain degree on the sample. Lysis solution a is added to the lysis unit 12 from the sample inlet 11. Two liquid release-control units 2 are provided to serve as the reagent pre-storage region to pre-store the cleaning solution reagent b and the eluent reagent c, and the sliding chamber 2202 is packaged on the chip by welding. The hot melt valve 7300 is provided between the lysis unit 12 and the nucleic acid purification region, and the lower side of the liquid storage cylinder 2201 is connected to the nucleic acid purification region through the diversion channel 2205. The nucleic acid purification region pre-stores magnetic beads that can absorb and release nucleic acids, and there magnetic beads are packaged by welding or gluing. After liquid separation by the rotating switch assembly 7100 of the liquid switch-control unit 4, the purified nucleic acid samples can be collected in the liquid transfer unit 6 (recovery cell), and then the liquid is allotted to the distribution and quantification chambers (weighing cells 8001) of the liquid quantitative dispersion unit 8 by centrifugation through the rotating switch assembly 7100 of the liquid flow-control unit 7, and the allotted samples can be further subjected to chemical or physical treatment during the centrifugation process. The liquid in the weighing cell 8001 is centrifuged at high speed and flows through the comb-tooth branch pipe 7402 to reach the reaction cell 9. The reaction cell 9 is the position where the pretreated sample reacts and produces the final product.

There are many methods for sample lysis, some of which require auxiliary heating process. The microfluidic chip herein adopts a hot melt valve to perform sample lysis. Due to the phase change properties of paraffin wax from the solid state to the liquid transition state, paraffin wax is used as a sealing valve, and a breakthrough point (a gap) is provided between the paraffin wax and the chip due to centrifugal force to open the sealing valve. Paraffin wax with a melting point of about 65° C. is sealed in the local thickened section 7301 of the hot melt valve 7300 in advance, and the required sample is heated for 15 min (55° C.) during the lysis process, and the paraffin wax with the melting point of 65° C. begins to enter the transition state from solid state to liquid state at 55° C., then high-speed (7000 rpm to 9000 rpm) centrifugation is performed (for 1 min to 2 min) to release the liquid in the lysis unit 12. When the rotation speed of the chip drops until the chip stops, a suitable external manipulator is inserted from the open recess on an upper portion of the rotating switch assembly 7100 into the rotating cooperation structure 7107 of the cylindrical rotor 7104, the chip is rotated by 60 degrees, and the upstream flat-end pipe 7105 leading to the upstream and the downstream flat-end pipe 7106 leading to the downstream are communicated to the liquid collection unit 5 through the strip-shaped groove 7103 on the bottom surface of the rotor 7104. The liquid enters the liquid collection unit 5 (waste liquid cell) through the nucleic acid purification region and the rotating switch assembly 7100 in the communication state by centrifugal force at a rotation speed of 7000 rpm to 9000 rpm.

After the release of the lysis solution a is completed, the liquid storage cylinder 2201 containing the cleaning solution reagent b and located inside the sliding chamber 2202 is pushed down by an external force, so that the bottom sealing film 2203 is pierced by the piercer 2204, and the cleaning solution reagent b in the liquid storage cylinder 2201 enters the sliding chamber 2202 from the breach; Especially under the action of the centrifugal force at the rotation speed of 7000 rpm to 9000 rpm, all the liquid in the liquid storage cylinder 2201 is released into the sliding chamber 2202 and can enter the nucleic acid purification region. At this time, the position of the rotating switch assembly 7100 remains unchanged, and the liquid enters the liquid collection unit 5 (waste liquid cell). After the cleaning liquid is completely released, the rotation speed drops until the chip stops, another liquid release-control unit 2 releases the eluent c according to the same operation, and then the upstream liquid is driven by centrifugal force at a rotation speed of 7000 rpm to 9000 rpm to enter the nucleic acid purification region through the liquid flow-control unit 7. After the liquid passes through the liquid switch-control unit 4, the rotor 7104 of the rotating switch assembly 7100 is rotated counterclockwise by 60°, and then the chip is rotated at a high speed (7000 rpm to 9000 rpm), and the liquid flows to the liquid transfer unit 6 (recovery cell).

Then the rotor 7104 of the rotating switch assembly 7100 is rotated counterclockwise by 60°, that is, the rotating switch assembly 7100 is in an occluded state, and the rotating switch assembly 7100 between the liquid transfer unit 6 (recovery cell) and the liquid quantitative dispersion unit 8 is also in an occluded state. In this state, centrifugation is continuously performed at high speed and low speed (for 1 min to 3 min) to fully mix the purified nucleic acid sample liquid with the PCR system pre-buried in the recovery cell. The liquid flow-control unit 7 (rotating switch assembly 7100) between the recovery cell and the liquid quantitative dispersion unit 8 is rotated counterclockwise by 60°, and is centrifuged at a low speed of 2000 rpm (for 1 min to 2 min). The purified nucleic acid sample liquid is driven by centrifugal force to flow through the liquid flow-control unit 7 (rotating switch assembly 7100) and enters the downstream distribution and quantification chamber, namely the weighing cell 8001, and then is centrifuged at a high speed (7000 rpm to 9000 rpm) to cause the liquid in the weighing cells 8001 to break through the comb-tooth branch pipe 7402 to reach the reaction cell 9, and to be mixed with reagents such as specific primers pre-buried in the reaction cell 9. After mixing, the instrument is operated to occlude the rotating switch assembly 7100, and the real-time fluorescent PCR amplification detection reaction is performed under the action of the external temperature control module.

Embodiment 3: High-Sensitivity Two-Step Constant-Temperature Amplification Nucleic Acid Detection Based on the Whole-Process Biological Detection Device Referring to FIG. 3, a whole-process biological detection microfluidic chip is provided in the third embodiment, which is mainly composed of a sample inlet 11, a lysis unit 12, a liquid release-control unit 2, an extraction unit 3, a liquid switch-control unit 4, a liquid collection unit 5, a pre-amplification unit, a liquid transfer unit 6, a liquid flow-control unit 7, a liquid quantitative dispersion unit 8, and a reaction cell 9.

The chip is provided with three liquid storage container bases, and each base is fixed with a liquid release-control unit 2 which can independently control the release when needed. As shown in FIG. 3, three liquid release-control units 2 arranged in order from right to left in FIG. 3 are respectively pre-stored with cleaning solution reagent, eluent reagent and diluent reagent. The three liquid release-control units 2 in this solution may adopt the liquid storage sac structure described above which is squeezable to release liquid, or may adopt the liquid storage cylinder structure. By pressing the liquid storage cylinder 2201, the sealing film 2203 can be pierced by the piercer 2204 to release liquid. The chip is provided with the lysis unit 12 and the sample inlet 11 arranged on the top of the lysis unit 12. The lysis unit 12 is pre-stored with a magnet, zirconia beads, and a lysis reagent pre-dried in the lysis unit 12. The downstream of the lysis unit 12 is connected to the upstream fluid chamber 3001 and the circular purification chamber of the extraction unit 3. The purification chamber is filled with a silica gel film for capturing and releasing nucleic acids. The downstream of the purification chamber is connected with the deflection cavity 4202, one end of the deflection cavity 4202 is connected with the liquid collection unit 5 (waste liquid cell), and another end of the deflection cavity is connected with a quantifying cell 82, and an overflow cell 83 is connected in parallel with the quantifying cell at the tail of the quantifying cell. The downstream of the quantifying cell 82 is connected to a set of pre-amplification cells 91 through the liquid flow-control unit 7, and dry reagents related to the reaction are pre-stored in the pre-amplification cells 91. The pre-amplification cell 91 is connected to the hollow chamber 61 through the liquid flow-control unit 7. In addition, the liquid release-control unit 2 storing the diluent reagent is connected to the hollow chamber 61 through a micropipe. The hollow chamber 61 is connected with the transfer chamber 63 through the liquid transfer channel 62. The liquid transfer channel 62 is a siphon pipe. One end of the siphon pipe is connected to the bottom of the hollow chamber 61, and another end of the siphon pipe is connected to the top of the transfer chamber 63. The transfer chamber 63 is filled with sponge. The downstream of the transfer chamber 63 is connected to the product-quantifying chamber 64 and the product-overflow chamber 65. The product-quantifying chamber 64 is connected to the downstream mixing chamber 66 through the liquid flow-control unit 7. Pre-dried amplification related reagents are provided in the mixing chamber 66. The mixing chamber 66 is connected with the downstream liquid quantitative dispersion unit 8 through the liquid flow-control unit 7. The weighing cell 8001 of the liquid quantitative dispersion unit 8 is connected with the reaction cell 9 through a section of capillary pipe (that is, the comb-tooth branch pipe 7402), and primers required for the amplification reaction are pre-dropped into the reaction cell 9.

Specific liquid path working process of the chip of the third embodiment is described in detail below by taking the detection process of a sputum sample as an example.

As shown in FIG. 3, first, the sputum sample is added to the lysis unit 12 through the sample inlet 11, and then the sample inlet 11 is sealed. The centrifugal force provided by the rotating motor is used as the driving force for the rotation of the chip. The chip is fixed on a tray of the instrument. Permanent magnets are arranged on the tray in a certain sequence. In a case that the rotating motor rotates at a low speed, the permanent magnets in the lysis unit 12 and the permanent magnets on the tray attract each other, so that the zirconia beads in the lysis unit 12 are stirred back and forth, and the pathogenic microorganisms are lysed to release nucleic acids under the dual action of mechanism and chemical reagents. After the grinding and lysis is completed, the rotating motor is rotated clockwise at a high speed, and the liquid in the lysis unit 12 is transferred to the upstream fluid chamber 3001 and the purification chamber of the extraction unit 3. While nucleic acid molecules pass through the purification chamber, the silicon film material pre-stored in the purification chamber can adsorb nucleic acid molecules, and the waste liquid flows into the liquid collection unit 5 (waste liquid cell) through the deflection cavity 4202 under the combined action of Coriolis force and centrifugal force, and the waste liquid is then absorbed and trapped by the water-absorbing material pre-placed in the waste liquid cell. After all the liquid in the lysis unit 12 is released, the liquid release-control unit 2 containing the cleaning solution reagent is squeezed from the top by means of an external ejector rod or the like. The tough upper cover 2101 of the liquid storage sac deforms after being compressed, and the liquid storage sac is deformed outward since the internal cleaning fluid reagent is compressed. Since the bottom bracket of the hot seal cover at the bottom of the liquid storage sac is made of easily tearable material and the pressure-bearing platform 2104 with a cutting edge is provided below the liquid storage sac, the liquid storage sac is ruptured at the cutting edge, and the cleaning solution reagent stored in the liquid storage sac enters the buffer chamber of the downstream extraction unit 3 (that is, the upstream fluid chamber 3001) from the breach. The centrifuge rotates clockwise. Under the action of low-speed centrifugal force, all the reagents in the liquid storage sac are released into the buffer chamber. The rotation speed of the centrifuge is increased. The cleaning solution in the buffer chamber passes through the purification chamber, removing the residual impurities on the silicon film. The waste liquid generated after cleaning enters the waste liquid cell of the liquid collection unit 5 through the deflection cavity 4202, and the waste liquid is absorbed and trapped by the water-absorbing material. Next, the liquid storage sac containing the eluent reagent is squeezed in the same method as above. With the help of counterclockwise centrifugation at high speed, the purified nucleic acid sample eluent is obtained after the liquid passes through the extraction unit 3. The liquid is transferred to the liquid quantifying cell 82 after passing through the deflection cavity 4202, and the excess liquid overflows into the overflow cell 83. After the centrifugation is stopped, the liquid is transferred to the inlet of the downstream pre-amplification cell 91 along the capillary pipe in the liquid flow-control unit 7 under the drive of capillary force. Then the centrifuge is restarted, and the eluent in the quantifying cell 82 is transferred to the pre-amplification cell 91 under the action of centrifugal force, and is uniformly mixed with the pre-dried reagent in the pre-amplification cell 91. The liquid is kept at 37° C. for 20 minutes to complete the primary amplification of nucleic acid. Then, the liquid storage sac containing the diluent reagent is squeezed in the same method as described above, and the diluent reagent is released to the top inlet of the hollow chamber 61. In addition, similarly, the liquid flow-control unit 7 at the downstream of the pre-amplification cell 91 transfers the primary nucleic acid amplification product to the side inlet of the hollow chamber 61. Then, the centrifuge is started again, and the primary nucleic acid amplification product and the diluent are transferred to the hollow chamber 61 and uniformly mixed. After the centrifugation is stopped, the diluted primary nucleic acid amplification product flows along the liquid transfer channel 62 (that is, the siphon pipe) and contacts with the water-absorbing material in the transfer chamber 63, and the liquid in the hollow chamber 61 is completely transferred to the hollow chamber 63 under the action of capillary force, so that the transfer of the liquid from the distal end to the proximal end of the chip is completed, which greatly reduces the size of the chip disc. After the primary nucleic acid amplification product is transferred, the centrifuge is started again, the liquid in the transfer chamber 63 is released to the downstream product-quantifying chamber 64 under the action of centrifugal force, and the excess liquid overflows into the product-overflow chamber 65. In the same way as described above, after the liquid passes through the liquid flow-control unit 7, the centrifuge is started again, and the liquid in the product-quantifying chamber 64 is transferred to the downstream mixing chamber 66 under the action of the centrifuge, and is uniformly mixed with the reagents pre-stored in the mixing chamber 66. After the reaction system is uniformly mixed, in the same way as described above, the liquid passes through the liquid flow-control unit 7, and the centrifuge is started again. In the case of low rotation speed, the liquid is transferred to the downstream liquid quantitative dispersion unit 8 under the action of centrifugal force, and is quantified in the weighing cell 8001. The centrifugal rotation speed is increased. The quantified liquid is transferred to the reaction cell 9 and is uniformly mixed with the primers pre-stored in the reaction cell 9. At 65° C., the reagents in the reaction cell 9 undergo a secondary amplification reaction. After this step, the amplification and detection process of the sputum sample ends.

Embodiment 4

Referring to FIG. 4, the chip of the fourth embodiment is provided with three liquid storage container bases, and each base is fixed with a liquid release-control unit 2 which can independently control the release when needed. As shown in FIG. 4, three liquid release-control units 2 arranged in order from right to left in FIG. 4 are respectively pre-stored with cleaning solution reagent, eluent reagent and diluent reagent. The three liquid release-control units 2 in this solution may adopt the liquid storage sac structure described above which is squeezable to release liquid, or may adopt the liquid storage cylinder structure. By pressing the liquid storage cylinder 2201, the sealing film 2203 can be pierced by the piercer 2204 to release liquid. The chip is provided with the lysis unit 12 and the sample inlet 11 arranged on the top of the lysis unit 12. The lysis unit 12 is pre-stored with a magnet, zirconia beads, and a lysis reagent pre-dried in the lysis unit 12. The downstream of the lysis unit 12 is connected to the buffer chamber of the extraction unit 3 (that is, the upstream fluid chamber 3001). Magnetic beads coated with silicon oxide for nucleic acid adsorption are pre-stored in the buffer chamber. A circular purification chamber is connected to the downstream, and the purification chamber is filled with a filter membrane which is configured to prevent the loss of upstream magnetic beads during centrifugation. The downstream of the purification chamber is connected with the deflection cavity 4202, one end of the deflection cavity 4202 is connected with the liquid collection unit 5 (waste liquid cell), and another end of the deflection cavity is connected with a quantifying cell 82, and an overflow cell 83 is connected in parallel with the quantifying cell at the tail of the quantifying cell. The downstream of the quantifying cell 82 is connected to a set of pre-amplification cells 91 through the liquid flow-control unit 7, and dry reagents related to the reaction are pre-stored in the pre-amplification cells 91. The pre-amplification cell 91 is connected to the hollow chamber 61 through the liquid flow-control unit 7. In addition, the liquid release-control unit 2 storing the diluent reagent is connected to the hollow chamber 61 through a micropipe. The downstream of the hollow chamber 61 is connected to the product-quantifying chamber 64 and the product-overflow chamber 65 through the liquid flow-control unit 7. The product-quantifying chamber 64 is connected to the downstream mixing chamber 66 through the liquid flow-control unit 7. Pre-dried amplification related reagents are provided in the mixing chamber 66. The mixing chamber 66 is connected with the downstream liquid quantitative dispersion unit 8 through the liquid flow-control unit 7. The weighing cell 8001 of the liquid quantitative dispersion unit 8 is connected with the reaction cell 9 through a section of capillary pipe (that is, the comb-tooth branch pipe 7402), and primers required for the amplification reaction are pre-dropped into the reaction cell 9.

Specific liquid path working process of the chip of the fourth embodiment is described in detail below by taking the detection process of a sputum sample as an example.

As shown in FIG. 4, first, the sputum sample is added to the lysis unit 12 through the sample inlet 11, and then the sample inlet 11 is sealed. The centrifugal force provided by the rotating motor is used as the driving force for the rotation of the chip. The chip is fixed on a tray of the instrument. Permanent magnets are arranged on the tray in a certain sequence. In a case that the rotating motor rotates at a low speed, the permanent magnets in the lysis unit 12 and the permanent magnets on the tray attract each other, so that the zirconia beads in the lysis unit 12 are stirred back and forth, and the pathogenic microorganisms are lysed to release nucleic acids under the dual action of mechanism and chemical reagents. After grinding and lysis, the rotating motor is rotated clockwise at a high speed, and the liquid in the lysis unit 12 is transferred to the upstream fluid chamber 3001 (that is, the buffer chamber) and the purification chamber of the extraction unit 3. The nucleic acid molecules are adsorbed by the magnetic beads when passing through the buffer chamber. While the liquid passes through the purification chamber, the magnetic beads with nucleic acid molecules adsorbed are blocked by the filter membrane in the purification chamber to avoid the loss of magnetic beads. The waste liquid flows into the liquid collection unit 5 (waste liquid cell) through the deflection cavity 4202 under the combined action of Coriolis force and centrifugal force, and the waste liquid is then absorbed and trapped by the water-absorbing material pre-placed in the waste liquid cell. After all the liquid in the lysis unit 12 is released, the liquid storage sac containing the cleaning solution reagent is squeezed from the top by means of an external ejector rod or the like. The tough upper cover of the liquid storage sac deforms after being compressed, and the liquid storage sac is deformed outward since the internal cleaning fluid reagent is compressed. Since the bottom bracket of the hot seal cover at the bottom of the liquid storage sac is made of easily tearable material and the pressure-bearing platform 2104 with a cutting edge is provided below the liquid storage sac, the liquid storage sac is ruptured at the cutting edge, and the cleaning solution reagent stored in the liquid storage sac enters the buffer chamber of the downstream extraction unit 3 (that is, the upstream fluid chamber 3001) from the breach. The centrifuge rotates clockwise. Under the action of low-speed centrifugal force, all the reagents in the liquid storage sac are released into the buffer chamber. The rotation speed of the centrifuge is increased. The cleaning solution in the buffer chamber passes through the purification chamber, removing the residual impurities on the magnetic beads and the filter membrane. The waste liquid generated after cleaning enters the liquid collection unit 5 (waste liquid cell) through the deflection cavity 4202, and the waste liquid is absorbed and trapped by the water-absorbing material. Next, the liquid storage sac containing the eluent reagent is squeezed in the same method as above. With the help of counterclockwise centrifugation at high speed, the purified nucleic acid sample eluent is obtained by eluting nucleic acids off from the magnetic beads after the liquid passes through the extraction unit 3. The liquid is transferred to the liquid quantifying cell 82 after passing through the deflection cavity 4202, and the excess liquid overflows into the overflow cell 83. After the centrifugation is stopped, the liquid is transferred to the inlet of the downstream pre-amplification cell 91 along the capillary pipe in the liquid flow-control unit 7 under the drive of capillary force. Then the centrifuge is restarted, and the eluent in the quantifying cell 82 is transferred to the pre-amplification cell 91 under the action of centrifugal force, and is uniformly mixed with the pre-dried reagent in the pre-amplification cell 91. The liquid is kept at 37° C. for 20 minutes to complete the primary amplification of nucleic acid. Then, the liquid storage sac containing the diluent reagent is squeezed in the same method as described above, and the diluent reagent is released to the top inlet of the hollow chamber 61. In addition, similarly, the liquid flow-control unit 7 at the downstream of the pre-amplification cell 91 transfers the primary nucleic acid amplification product to the side inlet of the hollow chamber 61. Then, the centrifuge is started again, and the primary nucleic acid amplification product and the diluent are transferred to the hollow chamber 61 and uniformly mixed. Similar to the above method, after the liquid passes through the liquid flow-control unit 7, the centrifuge is started again, the liquid in the hollow chamber 61 is released to the downstream product-quantifying chamber 64 under the action of centrifugal force, and the excess liquid overflows into the product-overflow chamber 65. In the same way as described above, after the liquid passes through the liquid flow-control unit 7, the centrifuge is started again, and the liquid in the product-quantifying chamber 64 is transferred to the downstream mixing chamber 66 under the action of the centrifuge, and is uniformly mixed with the reagents pre-stored in the mixing chamber 66. After the reaction system is uniformly mixed, in the same way as described above, the liquid passes through the liquid flow-control unit 7, and the centrifuge is started again. In the case of low rotation speed, the liquid is transferred to the downstream liquid quantitative dispersion unit 8 under the action of centrifugal force, and is quantified in the weighing cell 8001. The centrifugal rotation speed is increased. The quantified liquid is transferred to the reaction cell 9 and is uniformly mixed with the primers pre-stored in the reaction cell 9. At 65° C., the reagents in the reaction cell 9 undergo a secondary amplification reaction. After this step, the amplification and detection process of the sputum sample ends.

Embodiment 5

Referring to FIG. 3, a whole-process biological detection microfluidic chip is provided in the fifth embodiment, which is mainly composed of a sample inlet 11, a lysis unit 12, a liquid release-control unit 2, an extraction unit 3, a liquid switch-control unit 4, a liquid collection unit 5, a pre-amplification unit, a liquid transfer unit 6, a liquid flow-control unit 7, a liquid quantitative dispersion unit 8, and a reaction cell 9.

The chip is provided with three liquid storage container bases, and each base is fixed with a liquid release-control unit 2 which can independently control the release when needed. As shown in FIG. 5, three liquid release-control units 2 arranged in order from right to left in FIG. 5 are respectively pre-stored with a first cleaning solution reagent, a second cleaning solution reagent, and an eluent reagent. The three liquid release-control units 2 in this solution may adopt the liquid storage sac structure described above which is squeezable to release liquid, or may adopt the liquid storage cylinder structure. By pressing the liquid storage cylinder 2201, the sealing film 2203 can be pierced by the piercer 2204 to release liquid. The chip is provided with the lysis unit 12 and the sample inlet 11 arranged on the top of the lysis unit 12. The lysis unit 12 is pre-stored with a lysis reagent pre-dried in the lysis unit 12. The lysis unit 12 overlaps with two liquid release-control units 2 on the left of FIG. 5 in the radial direction of the chip, and the lysis unit 12 is located below the liquid release-control unit 2. As shown in FIG. 8, a sample-loading cover 1101 is provided above the sample inlet 11. The sample-loading cover 1101 is connected to the upper portion of the sample inlet 11 by snapping. The lysis unit 12 is communicated to the bottom of the sample inlet 11 and is arranged inside the reactor plate 101 and is located below part of the liquid release-control unit 2. With this arrangement, the lysis unit 12 and the liquid release-control unit 2 are arranged up and down in the vertical direction of the reactor plate 101, and the overlap portion between the two can further reduce the crosswise size and radial size and of the chip and improve space utilization rate. The downstream of the lysis unit 12 is connected to the upstream fluid chamber 3001 of the extraction unit 3, the upstream fluid chamber 3001 of the extraction unit 3 serves as the buffer chamber of the extraction unit 3, and the downstream of the upstream fluid chamber 3001 is connected to a purification chamber, which is filled with a silica gel film to achieve the capture and release of nucleic acids. The downstream of the purification chamber is connected to the deflection cavity 4202 of the liquid switch-control unit 4, one end of the deflection cavity 4202 is connected to the liquid collection unit 5 (waste liquid cell), and another end of the deflection cavity is connected to the eluent collection cell 84. The downstream of the eluent collection cell 84 is connected with a set of liquid flow-control units 7, an eluent temporary storage region and a pre-amplification cell 91. Dry reagents related to the reaction are pre-stored in the pre-amplification cell 91. The pre-amplification cell 91 is connected to a hollow chamber 61 through the liquid flow-control unit 7. The hollow chamber 61 is connected with a serpentine pipe 67 through a liquid transfer channel 62. One end of the liquid transfer channel 62 is connected to the bottom of the hollow chamber 61, and another end of the liquid transfer channel is connected to the top of the serpentine pipe 67. A branch port is provided at the top junction. The branch port is in communication with the gas path and undergoes hydrophobic treatment to prevent liquid from entering. The serpentine pipe 67 is arranged closer to the chip rotation center than the hollow chamber 61. The outlet at the bottom end of the serpentine pipe 67 is in communication with the mixing chamber 66. Amplification-related reagents are pre-dried in the mixing chamber 66. The mixing chamber 66 is connected with the downstream liquid quantitative dispersion unit 8 through the liquid flow-control unit 7. The weighing cell 8001 of the liquid quantitative dispersion unit 8 is connected with the reaction cell 9 through a section of capillary pipe (that is, the comb-tooth branch pipe 7402) and the buffer cell 8002 provided in the liquid quantitative dispersion unit, and primers required for the amplification reaction are pre-dropped into the reaction cell 9.

Specific liquid path working process of the chip of the fifth embodiment is described in detail below by taking the virus detection process of a throat swab sample as an example.

As shown in FIG. 5, first, the throat swab rinse solution sample is added to the lysis unit 12 through the sample inlet 11, and then the sample inlet 11 is sealed. A rotating motor is used to provide centrifugal force as the driving force for the rotation of the chip, the chip is fixed on a metal tray of the instrument, and the bottom of the metal tray is closely attached to a temperature-controllable heating film. The chip lysis unit 12 is heated to about 55° C. by means of the heating film, and the chemical reagents pre-placed in the lysis unit 12 lyse the virus in the sample to release nucleic acids. The rotating motor is rotated clockwise at a high speed, and the liquid in the lysis unit 12 is transferred to the upstream fluid chamber 3001 and the purification chamber of the extraction unit 3. While nucleic acid molecules pass through the purification chamber, the silicon film material pre-stored in the purification chamber can adsorb nucleic acid molecules, and the waste liquid flows into the liquid collection unit 5 (waste liquid cell) through the deflection cavity 4202 under the combined action of Coriolis force and centrifugal force, and the waste liquid is then absorbed and trapped by the water-absorbing material pre-placed in the waste liquid cell. After all the liquid in the lysis unit 12 is released, the liquid release-control unit 2 containing the first cleaning solution reagent is squeezed from the top by means of an external ejector rod or the like. The tough upper cover 2101 of the liquid storage sac deforms after being compressed, and the liquid storage sac is deformed outward since the internal first cleaning fluid reagent is compressed. Since the bottom bracket of the hot seal cover at the bottom of the liquid storage sac is made of easily tearable material and the pressure-bearing platform 2104 with a cutting edge is provided below the liquid storage sac, the liquid storage sac is ruptured at the cutting edge, and the first cleaning solution reagent stored in the liquid storage sac enters the buffer chamber of the downstream extraction unit 3 (that is, the upstream fluid chamber 3001) from the breach. The rotating motor rotates clockwise. Under the action of low-speed centrifugal force, all the reagents in the liquid storage sac are released into the buffer chamber of the extraction unit 3. The rotation speed is increased. The cleaning solution in the buffer chamber passes through the purification chamber, completing the first cleaning of the residual impurities on the silicon film. The waste liquid generated after the first cleaning enters the waste liquid cell of the liquid collection unit 5 through the deflection cavity 4202, and the waste liquid is absorbed and trapped by the water-absorbing material. Next, the liquid storage sac of the liquid release-control unit 2 containing the second cleaning solution reagent is squeezed in the same method as above. With the help of clockwise centrifugation at high speed, the cleaning solution in the buffer chamber flow through the purification chamber again, completing the second cleaning of the residual impurities on the silicon film. The waste liquid generated after the second cleaning enters the waste liquid cell of the liquid collection unit 5 through the deflection cavity 4202, and the waste liquid is absorbed and trapped by the water-absorbing material. In the above two cleaning processes, the first cleaning solution reagent and the second cleaning solution reagent may use the same cleaning solution, or the components of the two cleaning solutions may be different. The cleaning solution reagents can be selected according to the sample to be cleaned and other cleaning requirements. After the two cleaning processes, the nucleic acid samples left on the silicon film are relatively pure.

Next, the liquid storage sac of the liquid release-control unit 2 containing the eluent reagent is squeezed in the method of releasing the cleaning solution. With the help of counterclockwise centrifugation at high speed, the eluent flows through the buffer chamber and the purification chamber of the extraction unit 3 in sequence, and the purified nucleic acid sample eluent is obtained after the eluent passes through the extraction unit 3. The liquid is transferred to an eluent collection cell 84 after passing through the deflection cavity 4202 of the liquid switch-control unit 4. The liquid in the eluent collection cell 84 fills the downstream capillary pipe by stopping centrifugation or reducing the rotation speed. By centrifuging at 3000 rpm, the liquid is driven by the centrifugal force to enter the downstream eluent temporary storage region and the pre-amplification cell 91 through the capillary pipe. The eluent is uniformly mixed with the pre-dried reagents in the pre-amplification cell 91, and the liquid is kept at 37° C. for 20 minutes to complete the primary amplification of nucleic acid. After amplification, the centrifugation is performed again, and the eluent in the temporary storage region and the pre-amplification reaction product together flow through the downstream liquid flow-control unit 7 of the pre-amplification cell 91 into the hollow chamber 61, and are uniformly mixed therein. After the centrifugation is stopped, the primary nucleic acid amplification product diluted by the eluent in the hollow chamber 61 enters the liquid transfer channel 62 and the serpentine pipe 67 under the action of surface tension and advances until the product reaches another end of the serpentine pipe 67, so that the transfer of the liquid from the distal end to the proximal end of the chip is completed, which greatly reduces the size of the chip disc. Since the length and cross section of the serpentine pipe 67 is pre-determined, the volume of liquid entering the serpentine pipe 67 can be determined. The demarcation point between the liquid transfer channel 62 and the serpentine pipe 67 is located at the highest point of the entire liquid path, and a branch gas path 68 is connected to this point, thereby forming a three-fork junction. After the liquid fills up the liquid transfer channel 62 and the serpentine pipe 67, the liquid is disconnected at the three-fork junction at the highest point of the serpentine pipe 67 by means of centrifugation at high speed, where the quantified liquid in the serpentine pipe 67 enters the downstream mixing chamber 66 under the drive of centrifugal force, and the liquid in the liquid transfer channel 62 flows back to the hollow chamber 61, and till then the serpentine pipe 67 completes the function of quantifying and transferring liquid. The liquid in the serpentine pipe 67 is transferred to the downstream mixing chamber 66, and is uniformly mixed with the reagents pre-stored in the mixing chamber 66. After the reaction system is uniformly mixed, in the same way as described above, the liquid passes through the liquid flow-control unit 7, and the centrifuge is started again. In the case of medium rotation speed, the liquid is transferred to the downstream liquid quantitative dispersion unit 8 under the action of centrifugal force, and is quantified in the weighing cell 8001. The centrifugal rotation speed is increased. The quantified liquid is transferred to the reaction cell 9 and is uniformly mixed with the primers pre-stored in the reaction cell 9. At 65° C., the reagents in the reaction cell 9 undergo a secondary amplification reaction, and the reaction process and the product of the reaction process can be detected in real time based on a fluorescence curve. After this step, the nucleic acid extraction, amplification and detection processes of viruses in the throat swab sample are completed.

In the present specification, the embodiments are described in a progressive manner Each embodiment mainly focuses on an aspect different from other embodiments, and reference can be made to these similar parts among the embodiments.

According to the above description of the disclosed embodiments, those skilled in the art can implement or practice the present application. Various modifications to these embodiments are obvious to a person skilled in the art, the general principles defined herein may be implemented in other embodiments without departing from the spirit and scope of the present application. Hence, the present application is not limited to the embodiments disclosed herein, but is to conform to the widest scope in accordance with the principles and novel features disclosed herein.

The invention claimed is:

1. A whole-process biological detection device, comprising at least one reactor, wherein the reactor comprises at least one sample-loading unit, at least one liquid release-control unit, at least one extraction unit, at least one liquid switch-control unit, at least one liquid collection unit, at least one liquid transfer unit, at least one liquid flow-control unit, at least one liquid quantitative dispersion unit, a plurality of reaction cells, and a plurality of flow channels;

these units are communicated through the plurality of flow channels, wherein, the at least one sample-loading unit and the at least one liquid release-control unit are respectively communicated to the upstream of the at least one extraction unit, and the downstream of the at least one extraction unit is communicated to the at least one liquid switch-control unit, and the downstream of the at least one liquid switch-control unit is communicated to the at least one liquid collection unit and the at least one liquid transfer unit respectively; the at least one liquid collection unit and the at least one liquid transfer unit are respectively located on two sides of the at least one extraction unit, the at least one liquid transfer unit is communicated to the at least one downstream liquid quantitative dispersion unit through a first liquid flow-control unit; and the at least one liquid quantitative dispersion unit is in communication with the plurality of downstream reaction cells through a plurality of comb-tooth branch pipes in one-to-one correspondence; and while the at least one reactor rotates around a chip rotation axis, liquid in the reactor is able to flow from an upstream unit to a downstream unit through each flow channel under centrifugal force or surface tension or both of the centrifugal force and the surface tension.

2. The whole-process biological detection device according to claim 1, wherein the reactor further comprises at least one pre-amplification unit, and the sample-loading unit comprises a sample inlet and a sample-loading chamber, wherein the sample-loading chamber is a lysis unit, and the lysis unit is communicated to the downstream of the sample inlet, the downstream of the lysis unit is in communication with the extraction unit through a second liquid flow-control unit, the pre-amplification unit is connected between the liquid switch-control unit and the liquid transfer unit, the pre-amplification unit comprises a pre-amplification cell and one or more sets of parallel quantifying cells located at the upstream of the pre-amplification cell, a dry pre-amplification reagent is provided in the pre-amplification cell, the upstream of the quantifying cell is connected with an outlet of the liquid switch-control unit, and the downstream of the quantifying cell is connected with the pre-amplification cell through a third liquid flow-control unit; and the liquid transfer unit comprises a hollow chamber, a product-transfer quantifying unit and a mixing chamber, the downstream of the pre-amplification unit is in communication with the hollow chamber through a fourth liquid flow-control unit, and the downstream of the hollow chamber is connected with the product-transfer quantifying unit; the product-transfer quantifying unit is connected with the mixing chamber through a fifth liquid flow-control unit, and the downstream of the mixing chamber is in communication with the downstream liquid quantitative dispersion unit through a sixth liquid flow-control unit.

3. The whole-process biological detection device according to claim 2, wherein the product-transfer quantifying unit comprises a transfer chamber and a product-quantifying chamber, a distance between the transfer chamber and a chip rotation center is smaller than the distance between the hollow chamber and the chip rotation center, a bottom outlet of the hollow chamber is connected to the top of the transfer chamber through a liquid transfer channel, the downstream of the transfer chamber is in communication with the product-quantifying chamber, and the downstream of the product-quantifying chamber is in communication with the mixing chamber through the liquid flow-control unit.

4. The whole-process biological detection device according to claim 2, wherein the product-transfer quantifying unit comprises a product-quantifying chamber located at the downstream of the hollow chamber and a product-overflow chamber connected in parallel with the product-quantifying chamber, the downstream of the hollow chamber is connected with the product-quantifying chamber through the liquid flow-control unit, and the downstream of the product-quantifying chamber is connected with the mixing chamber through the liquid flow-control unit.

5. The whole-process biological detection device according to claim 2, wherein the product-transfer quantifying unit comprises a serpentine pipe, and a distance between the serpentine pipe and a chip rotation center is smaller than the distance between the hollow chamber and the chip rotation center, and a bottom outlet of the hollow chamber is connected to the top of the serpentine pipe through a liquid transfer channel, and the bottom outlet of the serpentine pipe is in communication with the mixing chamber.

6. The whole-process biological detection device according to claim 1, wherein the liquid release-control unit comprises a diversion groove provided on the reactor and a compressible liquid storage container which hermetically covers the diversion groove and is used for storing liquid, the liquid storage container comprises a tough upper cover positioned outside the reactor and a brittle bottom bracket positioned between the tough upper cover and the diversion groove, the brittle bottom bracket seals against an upper end opening of the diversion groove and defines a closed chamber for storing liquid together with the tough upper cover, and the fracture strength of the brittle bottom bracket is lower than that of the tough upper cover, and when liquid pressure on the brittle bottom bracket is greater than or equal to the rupturing strength of the brittle bottom bracket, the brittle bottom bracket ruptures and communicates the liquid storage container with the diversion groove.

7. The whole-process biological detection device according to claim 6, wherein a pressure-bearing platform is fixed inside the diversion groove, and a cutting edge is provided at an upper end of the pressure-bearing platform, and the cutting edge abuts against a lower surface of the brittle bottom bracket.

8. The whole-process biological detection device according to claim 1, wherein the liquid release-control unit comprises a diversion channel arranged on the reactor and a slidable liquid collection unit which hermetically covers the diversion channel, the slidable liquid collection unit comprises a cylindrical sliding chamber with two open ends, a lower end opening of the sliding chamber surrounds an upper end opening of the diversion channel and is hermetically connected to the surface of the reactor, a liquid storage cylinder for storing liquid is provided inside the sliding chamber and is slidable up and down along an inner wall of the sliding chamber, and the outer periphery of the liquid storage cylinder is in sealing and sliding fit with the inner wall of the sliding chamber, a position-limiting structure for limiting the liquid storage cylinder from sliding out is provided at an upper end opening of the sliding chamber, a sealing film is provided at the bottom of the liquid storage cylinder, and a piercer located below the sealing film for piercing the sealing film is fixed on a side where the upper end opening of the diversion channel is located.

9. The whole-process biological detection device according to claim 1, wherein the liquid flow-control unit is a rotary opening-closing component, the rotary opening-closing component comprises a fixed housing, a base and a cylindrical rotor, the fixed housing is a cylindrical housing with two open ends, and a lower end of the fixed housing is fixed on the base; the rotor rotates around an axis of the rotor itself and cooperates with an inner wall of the fixed housing; a position-limiting structure for limiting the rotor from coming out is provided at an upper end of the fixed housing, a rotating cooperation structure for driving the rotor to rotate is provided at the upper end of the rotor, and a strip-shaped groove is provided at a lower end of the rotor; an upper surface of the base is closely attached to a lower end surface of the rotor and is provided with an upstream flat-end pipe communicating with the upstream unit and a downstream flat-end pipe communicating with the downstream unit, and the upstream flat-end pipe and the downstream flat-end pipe are spaced apart;

when the rotor rotates to a communication position, the strip-shaped groove communicates the upstream flat-end pipe with the downstream flat-end pipe; and when the rotor rotates to an occluded position, the lower end surface of the rotor cuts off the upstream flat-end pipe from the downstream flat-end pipe.

10. The whole-process biological detection device according to claim 1, wherein the at least one liquid flow-control unit is a curved capillary pipe, a pipe inlet of the capillary pipe is connected with an outlet of an upstream unit and a pipe outlet of the capillary pipe is connected with an inlet of a downstream unit; a distance between the pipe outlet and a chip rotation center is greater than the distance between the pipe inlet and the chip rotation center, and the distance between a proximal end, which is closest to the chip rotation center, of the capillary pipe and the chip rotation center is smaller than the distance between a proximal end of the upstream unit and the chip rotation center.

11. The whole-process biological detection device according to claim 1, wherein the liquid flow-control unit is a section of a pipe, a part of the pipe is provided with a local thickened section, and a hot melt material is sealed in the local thickened section.

12. The whole-process biological detection device according to claim 1, wherein the liquid flow-control unit is a flow resistance valve pipe part of which is provided with a flow resistance increasing element, and when the liquid pressure in the flow resistance valve pipe is smaller than a conduction hydraulic threshold of the flow resistance increasing element, the flow resistance increasing element prevents the liquid from passing through; and when the liquid pressure in the flow resistance valve pipe is greater than or equal to the conduction hydraulic threshold of the flow resistance increasing element, the flow resistance increasing element allows the liquid to pass through.

13. The whole-process biological detection device according to claim 1, wherein the extraction unit comprises an upstream fluid chamber and a downstream fluid chamber arranged in series, and a porous biomacromolecule absorption material filled in the downstream fluid chamber; the upstream fluid chamber has a plurality of fluid inlets, and the downstream fluid chamber has a fluid outlet, and the volume of the upstream fluid chamber is larger than the maximum value of the volumes of the upstream sample-loading unit and the liquid release-control unit.

14. The whole-process biological detection device according to claim 1, wherein the liquid switch-control unit is a rotating switch assembly, and the rotating switch assembly comprises a fixed housing, a base and a cylindrical rotor; the fixed housing is a cylindrical housing with two open ends, a lower end of the fixed housing is fixed on the base, and the rotor rotates around an axis of the rotor itself and cooperates with an inner wall of the fixed housing; a position-limiting structure for limiting the rotor from coming out is provided at an upper end of the fixed housing; a rotating cooperation structure for driving the rotor to rotate is provided at the upper end of the rotor, and a strip-shaped groove is provided at the lower end of the rotor;

an upper surface of the base is closely attached to a lower end surface of the rotor, and is provided with an upstream flat-end pipe communicating with the upstream unit and a first downstream flat-end pipe and a second downstream flat-end pipe respectively communicating with two downstream units, and the upstream flat-end pipe and the two downstream flat-end pipes are spaced apart;

when the rotor rotates to a first communication position, the strip-shaped groove communicates the upstream flat-end pipe with the first downstream flat-end pipe;

when the rotor rotates to a second communication position, the strip-shaped groove communicates the upstream flat-end pipe with the second downstream flat-end pipe; and when the rotor rotates to an occluded position, the lower end surface of the rotor cuts off the upstream flat-end pipe.

15. The whole-process biological detection device according to claim 1, wherein the liquid switch-control unit comprises an arc-shaped pipe and a ferromagnetic ball located inside the arc-shaped pipe; a pipe center line of the arc-shaped pipe is arc-shaped and the middle part of the arc-shaped pipe protrudes towards a chip rotation center; a cross section of the arc-shaped pipe is circular, a liquid inlet for communicating with the upstream unit is provided at the proximal end of the arc-shaped pipe, and two liquid outlets are respectively provided at two distal ends, which are furthest from the chip rotation center, of the arc-shaped pipe;

the ferromagnetic ball is in sealing contact with the inner wall of the arc-shaped pipe and is configured to slide back and forth between the two distal ends of the arc-shaped pipe to block the liquid outlet.

16. The whole-process biological detection device according to claim 1, wherein the liquid switch-control unit comprises a deflection cavity, a liquid inlet communicating with an upstream unit is provided in the middle of the proximal end of the deflection cavity, and two liquid outlets communicating with a downstream unit are respectively provided at the left and right sides of the distal end of the deflection cavity.

17. The whole-process biological detection device according to claim 1, wherein the liquid collection unit comprises a liquid storage chamber, a liquid storage inlet communicating with an upstream unit is provided at the top of the liquid storage chamber, and the volume of the liquid storage chamber is larger than the sum of the volumes of the upstream sample-loading unit and the upstream liquid release-control unit.

18. The whole-process biological detection device according to claim 1, comprising a reactor plate, wherein a plurality of uniformly distributed reactors are fixed on the circumference of the reactor plate.

* * * * *